(12) United States Patent
Kim et al.

(10) Patent No.: US 10,950,206 B2
(45) Date of Patent: Mar. 16, 2021

(54) ELECTRONIC APPARATUS AND METHOD FOR DISPLAYING CONTENTS THEREOF

(71) Applicant: SAMSUNG ELECTRONICS CO., LTD., Suwon-si (KR)

(72) Inventors: Ha-na Kim, Suwon-si (KR); Soo-hong Kim, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 35 days.

(21) Appl. No.: 15/797,353

(22) Filed: Oct. 30, 2017

(65) Prior Publication Data
US 2018/0301121 A1 Oct. 18, 2018

(30) Foreign Application Priority Data

Apr. 13, 2017 (KR) .................. 10-2017-0047775
Apr. 24, 2017 (KR) .................. 10-2017-0052445
May 11, 2017 (KR) .................. 10-2017-0058465

(51) Int. Cl.
G09G 5/377 (2006.01)
G09G 5/373 (2006.01)
(Continued)

(52) U.S. Cl.
CPC ............. G09G 5/377 (2013.01); G09G 5/227 (2013.01); G09G 5/373 (2013.01);
(Continued)

(58) Field of Classification Search
CPC .. G06F 3/0481; G06F 3/04817; G06F 3/0482; G06F 3/04842; G06F 2203/04804;
(Continued)

(56) References Cited

U.S. PATENT DOCUMENTS 8,144,174 B2  3/2012 Shiomi et al.
8,204,547 B2  6/2012 Jang
(Continued)

FOREIGN PATENT DOCUMENTS

JP  2005-39794 A   2/2005
JP  2006-189708 A  7/2006
(Continued)

OTHER PUBLICATIONS

Search Report dated Jun. 14, 2018, issued by the International Searching Authority in counterpart International Patent Application No. PCT/KR2018/002723 (PCT/ISA/210).
(Continued)

Primary Examiner — Xiao M Wu
Assistant Examiner — Scott E Sonners
(74) Attorney, Agent, or Firm — Sughrue Mion, PLLC

(57) ABSTRACT

An electronic apparatus includes a display and a processor for controlling the display. In response to the electronic apparatus operating in a first operating mode, the processor displays a content screen including a background image layer with a rear background image of the electronic apparatus and an object layer with a graphic object in the display. In response to receiving a convert command to convert to a second operating mode, the processor decreases a resolution of the content screen displayed in the display and adds a content layer including a content image enlarged gradually from a region of the content screen to the an entirety of the content screen.

15 Claims, 42 Drawing Sheets

(51) Int. Cl.
  *G09G 5/22* (2006.01)
  *H04N 21/431* (2011.01)
  *H04N 21/422* (2011.01)
  *H04N 7/00* (2011.01)
  *H04N 21/4223* (2011.01)
  *H04N 21/41* (2011.01)

(52) U.S. Cl.
  CPC ... *H04N 21/42204* (2013.01); *H04N 21/4312* (2013.01); *G09G 2320/0606* (2013.01); *G09G 2320/08* (2013.01); *G09G 2340/04* (2013.01); *G09G 2340/045* (2013.01); *G09G 2340/0407* (2013.01); *G09G 2340/10* (2013.01); *G09G 2340/12* (2013.01); *G09G 2340/125* (2013.01); *G09G 2354/00* (2013.01); *H04N 7/002* (2013.01); *H04N 21/4126* (2013.01); *H04N 21/4223* (2013.01)

(58) Field of Classification Search
  CPC ........ G06F 9/451; G06F 3/0484; G06F 3/048; G06F 16/904; G06F 2203/04806; G06F 3/0416; G06F 3/04815; G06F 3/04845; G06F 3/14; G06F 16/44; G06F 2203/04803; G06F 3/0486; G06F 2203/04805; G06F 3/04886; G06F 8/38; H04N 21/4316; G06T 11/60; G06T 2207/20021; G06T 2219/2016; H04L 65/4084; H04L 65/604; G09G 5/14; G09G 2340/12; G09G 2340/10; G09G 2340/0442; G09G 2310/0232; G09G 2340/0407; G09G 2340/0464; G09G 2340/125; G09G 2340/14; G09G 5/006; G09G 5/377; G09G 2320/0606
  See application file for complete search history.

(56) References Cited

U.S. PATENT DOCUMENTS

| | | | |
|---|---|---|---|
| 8,286,078 | B2 | 10/2012 | Yi |
| 9,247,298 | B2 | 1/2016 | Kim |
| 9,712,583 | B2 | 7/2017 | Yeom et al. |
| 2006/0010476 | A1 | 1/2006 | Kelly et al. |
| 2009/0058822 | A1* | 3/2009 | Chaudhri ............ G06F 3/04883 345/173 |
| 2010/0115398 | A1 | 5/2010 | Yi |
| 2010/0245651 | A1 | 9/2010 | Minamino |
| 2011/0157024 | A1 | 6/2011 | Chao |
| 2012/0013646 | A1* | 1/2012 | Ichioka .................. G09G 5/00 345/690 |
| 2013/0205194 | A1 | 8/2013 | Decker et al. |
| 2014/0123183 | A1* | 5/2014 | Fujimoto ............. H04N 5/4403 725/37 |
| 2014/0123190 | A1 | 5/2014 | Song et al. |
| 2014/0160353 | A1 | 6/2014 | Li et al. |
| 2014/0176601 | A1 | 6/2014 | Hamasaki |
| 2015/0067595 | A1 | 3/2015 | Hilbrink et al. |
| 2015/0193103 | A1 | 7/2015 | Lee et al. |
| 2016/0036877 | A1 | 2/2016 | Yeom et al. |

FOREIGN PATENT DOCUMENTS

| | | |
|---|---|---|
| JP | 2009-246928 A | 10/2009 |
| JP | 2012-156834 A | 8/2012 |
| JP | 2014-123855 A | 7/2014 |
| JP | 5795047 B2 | 10/2015 |
| KR | 10-2010-0048433 A | 5/2010 |
| KR | 10-1365990 B1 | 3/2014 |
| KR | 10-1464431 B1 | 11/2014 |
| KR | 10-2014-0146488 A | 12/2014 |
| KR | 10-2015-0017337 A | 2/2015 |
| KR | 10-2015-0020785 A | 2/2015 |
| KR | 10-1528848 B1 | 6/2015 |
| KR | 10-2015-0081708 A | 7/2015 |
| KR | 10-1533064 B1 | 7/2015 |
| KR | 10-2016-0016245 A | 2/2016 |
| KR | 10-2016-0075463 A | 6/2016 |
| KR | 10-1629813 B1 | 6/2016 |
| KR | 10-1636567 B1 | 7/2016 |
| KR | 10-1654106 B1 | 9/2016 |

OTHER PUBLICATIONS

Written Opinion dated Jun. 14, 2018, issued by the International Searching Authority in counterpart International Patent Application No. PCT/KR2018/002723 (PCT/ISA/237).

"LG Electronics launches Gallery OLED TV in Korea", Home Entertainment, Jan. 10, 2017, 7 pages total,[http://social.lge.co.kr/newsroom/he/galleryoledtv_1204/].

"Tutorial: Create a Transparent Screen Trick Photo", Photoxels, XP055482848, 15 pages, Retrieved from URL: https://www.photoxels.com/create-a-transparent-screen-trick-photo/ Aug. 8, 2010.

Communication dated Dec. 13, 2019 issued by the European Patent Office in counterpart European Application No. 18784158.0.

Communication dated Jan. 27, 2021 issued by the European Patent Office in application No. 18784158.0.

* cited by examiner

ELECTRONIC APPARATUS AND METHOD FOR DISPLAYING CONTENTS THEREOF

CROSS-REFERENCE TO RELATED APPLICATIONS

This application claims priority from Korean Patent Application No. 10-2017-0047775, filed on Apr. 13, 2017, Korean Patent Application No. 10-2017-0052445, filed on Apr. 24, 2017, and Korean Patent Application No. 10-2017-0058465, filed on May 11, 2017, in the Korean Intellectual Property Office, the disclosures of which are incorporated herein by reference in their entireties.

BACKGROUND

1. Field

Apparatuses and methods consistent with example embodiments relate to an electronic apparatus that displays a background image and a content image selectively according to an operating mode and a method for displaying contents thereof.

2. Description of the Related Art

In recent years, many diverse user experiences with electronic apparatuses have been developed. For example, electronic apparatuses may display various graphic objects together with a background image to provide a user with an image. However, when an image displayed in an electronic apparatus is changed, a processing speed of a processor may be decreased. Accordingly, there is a use for a method of efficiently displaying images or contents when an operating mode of an electronic apparatus is changed.

SUMMARY

Example embodiments have been provided to address the aforementioned and other problems and disadvantages occurring in the related art, and aspects of example embodiments provide an electronic apparatus which displays various images efficiently in response to a change of an operating mode and a method for displaying contents thereof.

According to an aspect of an example embodiment, there is provided an electronic apparatus including: a display; and a processor configured to: in response to determining that the electronic apparatus is operating in a first operating mode, control the display to display a content screen including a background image layer with a rear background image of the electronic apparatus and an object layer with a graphic object in the display, and in response to receiving a convert command to convert to a second operating mode, decrease a resolution of the content screen and add a content layer that includes a content image enlarged gradually from a region of the content screen to an entirety of the content screen.

The processor may be further configured to, in response to the content image in the content layer being enlarged to be of equal size to the entirety of the content screen, remove the displayed content screen and display another content screen including the enlarged content image in the display.

The another content screen may have a resolution higher than the decreased resolution of the content screen.

The processor may be further configured to, in response to receiving the convert command to convert to the second operating mode, decrease a resolution of the object layer.

The content screen may further include a shadow layer, and wherein the processor may be further configured to, in response to receiving the convert command to convert to the second operating mode, remove the shadow layer.

The processor may be further configured to: in response to determining that the electronic apparatus is operating in the second operating mode, display the another content screen including the content layer in the display, and in response to receiving a convert command to convert to the first operating mode, decrease the resolution of the another content screen displayed in the display and enlarge the content screen gradually from a region of the another content screen.

The another content screen may further include an object layer that is different from the object layer of the content screen, and the processor may be further configured to, in response to receiving the convert command to convert from the second operating mode to the first operating mode, remove the object layer in the another content screen.

The electronic apparatus may further include a communicator; and a memory configured to store the rear background image of the electronic apparatus, and the processor may be further configured to, in response to receiving a signal corresponding to a user interaction inputted from a user terminal through the communicator, control the display to generate the content screen by adding an interaction layer with an interaction object corresponding to the user interaction and display the generated content screen.

The processor may be further configured to, based on the user interaction, change at least one from among a size, a number, a position, a color, and a brightness of the graphic object.

The memory may be configured to store data about the change of the graphic object corresponding to the user interaction.

According to an aspect of another example embodiment, there is provided a method for displaying contents of an electronic apparatus, the method including: displaying, in response to determining that the electronic apparatus is operating in a first operating mode, a content screen including a background image layer with a rear background image of the electronic apparatus and an object layer with a graphic object; and decreasing, in response to receiving a convert command to convert to a second operating mode, a resolution of the content screen and adding a content layer that includes a content image enlarged gradually from a region of the content screen to an entirety of the content screen.

The another content screen may have a resolution higher than the decreased resolution of the content screen.

The resolution of the content screen may be decreased by resolution adjustment of the object layer.

The content screen may further include a shadow layer, wherein the method may further include, in response to the first operating mode being converted to the second operating mode, removing the shadow layer.

The method may further include displaying, in response to determining that the electronic apparatus is operating in the second operating mode, the another content screen including the content layer, and decreasing, in response to receiving a convert command to convert to the first operating mode, the resolution of the another content screen and gradually enlarging the content screen from a region of the another content screen.

The another content screen may further include an object layer that is different from the object layer of the content screen, and the method may further include, in response to the second operating mode being converted to the first operating mode, removing the object layer in the another content screen.

The method may further include receiving a user interaction inputted from a user terminal; generating the content screen by adding an interaction layer with an interaction object corresponding to the user interaction; and displaying the generated content screen.

The generating may include changing at least one from among a size, a number, a position, a color, and brightness of the graphic object based on the user interaction.

According to an aspect of another example embodiment, there is provided a remote control apparatus for remotely controlling an electronic apparatus, the remote control apparatus including: a display; a first communicator; a second communicator; and a processor configured to: display a first User Interface (UI) screen for controlling the electronic apparatus through the first communicator in a first region of the display; display a second UI screen for controlling a first external electronic apparatus connected to the electronic apparatus in a second region of the display; receive external apparatus-connection information of the electronic apparatus through the second communicator to display a third UI screen for displaying the external apparatus-connection information about one or more external electronic apparatuses in a third region of the display; transmit, in response to a second external electronic apparatus connected to the electronic apparatus being selected based on the external apparatus-connection information displayed in the third UI screen, a select command to select the second external electronic apparatus to the electronic apparatus through the second communicator; and change the second UI screen displayed in the second region to a fourth UI screen for controlling the second external electronic apparatus.

According to an aspect of another example embodiment, there is provided a non-transitory computer-readable storage medium storing instructions for causing a computer to: display, in response to determining that an electronic apparatus is operating in a first operating mode, a content screen including a background image layer with a rear background image of the electronic apparatus and an object layer with a graphic object in the display, and in response to receiving a convert command to convert to a second operating mode, decrease a resolution of the content screen and add a content layer that includes a content image enlarged gradually from a region of the content screen to an entirety of the content screen.

The non-transitory computer-readable storage medium of may further cause the computer to: generate, in response to receiving a signal corresponding to a user interaction inputted from a user terminal, the content screen by adding an interaction layer with an interaction object corresponding to the user interaction and display the generated content screen.

The user interaction may be one from among a doodle interaction, a voice command, and a user motion.

The rear background image may be acquired from a camera connected to the electronic apparatus.

According to the above-described example embodiments, the electronic apparatus may display various images efficiently in response to a change of an operating mode. Accordingly, it is possible to increase a processing speed of the electronic apparatus and enhance user satisfaction.

BRIEF DESCRIPTION OF DRAWINGS

The above and/or other aspects will be more apparent by describing example embodiments with reference to the accompanying drawings, in which.

DETAILED DESCRIPTION

The present disclosure provides one or more example embodiments, and many alternatives, modifications, and variations may be applied to the example embodiments. In the following description, example embodiments are illustrated and described in detail in the accompanying drawings and the detailed description. However, it should be noted that the example embodiments do not limit the scope of the invention of the present disclosure to any particular embodiment and include all modifications, equivalents, and/or replacements that belong to the range of a technical concept and a technical scope disclosed herein. If it is determined that a detailed description on a publicly-known related art may obscure the gist of the present disclosure, the detailed description may be omitted.

In the following description, a term including an ordinal, for example, 'first' or 'second,' may be used to distinguish elements, but the elements are not limited by the ordinal. The ordinal is used to only distinguish the same or similar elements.

The terms used in the following description are provided to describe an example embodiment and are not intended to limit the scope of right of the present disclosure. A term in a singular form includes a plural form unless it is intentionally written to exclude the plural form. In the following description, a term 'including' or 'consisting of' refers to the disclosed features, numbers, steps, operations, elements, parts, or combinations thereof and is not intended to exclude any possibilities of existence or addition of one or more other features, numbers, steps, operations, elements, parts, or combinations thereof.

In the example embodiments, a 'module' or 'unit' refers to an element that performs at least one function or operation. The 'module' or 'unit' may be realized as hardware, software, or combinations thereof. A plurality of 'modules' or 'units' may be integrated into at least one module and realized as at least one processor, except for a case in which the respective 'modules' or 'units' are realized as discrete specific hardware.

Figure 1:
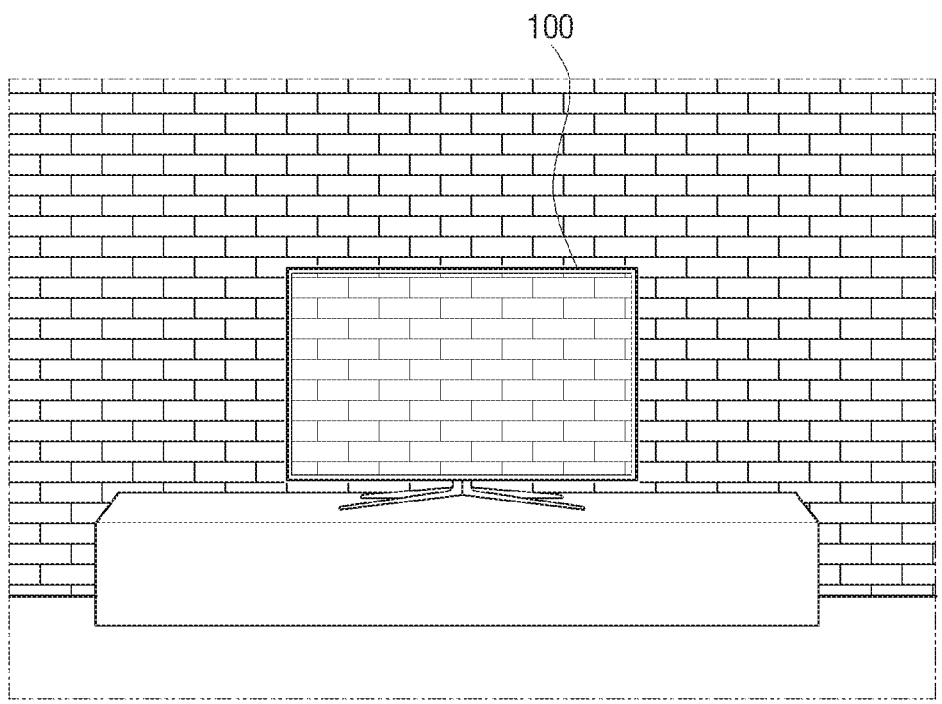
FIG. 1 is a diagram illustrating an example in which a display provides an image effect like a clear glass window, according to an example embodiment.

According to an example embodiment illustrated in FIG. 1, an electronic apparatus 100 may display its rear background image thereby providing a user with a visible effect of viewing a clear glass window. The rear background image may be realized as a live view acquired by a camera on a rear side of the electronic apparatus 100 or realized as a still image or a moving image pre-stored in the electronic apparatus 100.

Further, the electronic apparatus 100 may display various graphic objects together with the background image to provide the user with an aesthetic effect. In this case, the electronic apparatus 100 may play back diverse contents images on top of the background image.

The following description describes examples in which an electronic apparatus displays various content screens using a display, but example embodiments are not limited thereto. That is, an electronic apparatus 100 may include a set-top box and an Over the Top (OTT) device. In this case, the electronic apparatus 100 may transmit a video signal to an external display apparatus. The external display apparatus that received the video signal may display various content screens. In the following description, the electronic apparatus 100 includes a display, which is an example for convenience in explanation and a better understanding. As described above, the technical concept of the present disclosure may be applied to an electronic apparatus 100 without a display in the same manner.

Example embodiments are described below in greater detail with reference to the accompanying drawings.

According to an example embodiment, an electronic apparatus 100 has a plurality of operating modes. A first operating mode, one of the plurality of operating modes, may display a content screen including an image of a rear background of the electronic apparatus 100 (hereinafter referred to as 'background image') thereby providing a user with a visible effect of a clear glass window. The content screen may include a background image of the rear side of the electronic apparatus 100 and include at least one object and a shadow of the at least one object. The first operating mode may be called 'background image mode' or 'background mode' for convenience in explanation. In the following description, the term 'background mode' will be used to refer to the first operating mode.

In the first operating mode, the electronic apparatus 100 may display a background region of the rear side of the electronic apparatus 100 as a background image. Accordingly, the user may feel as though the electronic apparatus 100 is a clear glass window.

In the first operating mode, the electronic apparatus 100 may display a specific graphic object as well as the background screen. In this case, the specific graphic object may be a clock object or a vine object, but example embodiments are not limited thereto. The electronic apparatus 100 may display various wall-mounted types of graphic objects (for example, a picture, a photo, a fishbowl, a note, or the like).

Further, in the first operating mode, the electronic apparatus 100 may display an interaction object as well as the graphic object. In this case, the interaction object may be an object consistent with or corresponding to a user interaction.

A second operating mode, another operating mode of the electronic apparatus 100, refers to a mode for displaying a general image. The second operating mode is a mode for displaying contents pre-stored in the electronic apparatus 100 or broadcast contents received from an external source by using a full screen of the electronic apparatus. The 'second operating mode' is a term for convenience in explanation, and the second operating mode may be referred to as 'normal mode' or 'content mode.' In the following description, the term 'normal mode' will be used to refer to the second operating mode.

In the second operating mode, the electronic apparatus 100 may display a specific content object as well as the general image. In this case, the specific content object may be an object including information on the general image or an object including information on an available channel.

In the following description, to distinguish the content screens displayed in the second operating mode and in the first operating mode, a content screen displayed in the second operating mode will be referred to as 'second content screen,' and a content screen displayed in the first operating mode will be referred to as 'first content screen.'

Hereinafter, a method for displaying contents in the second operating mode and in the first operating mode of the electronic apparatus will be described. However, the electronic apparatus may have various operating modes other than the above-described second and first operating modes.

In the following description, the above operation of the electronic apparatus 100 will be described in further detail with reference to specific components thereof.

Figure 2:
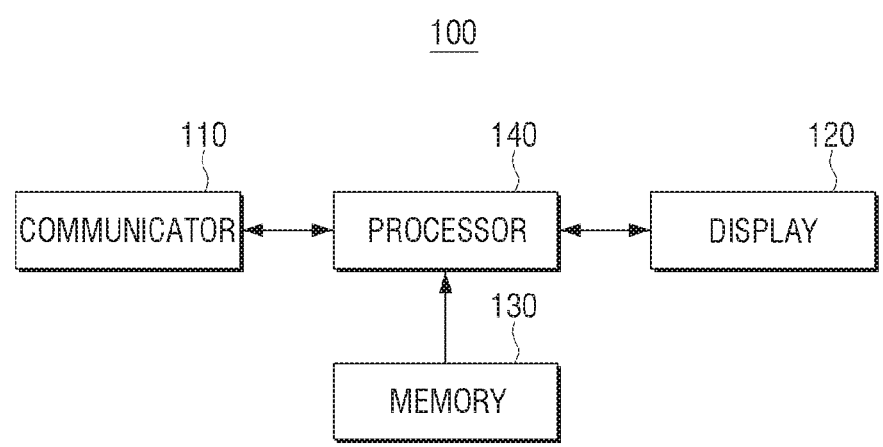
FIG. 2 is a block diagram illustrating a structure of an electronic apparatus, according to an example embodiment.

FIG. 2 is a block diagram illustrating a structure of an electronic apparatus 100, according to an example embodiment. As illustrated in FIG. 2, the electronic apparatus 100 may include a communicator 110, a display 120, a memory 130, and a processor 140.

The communicator 110 receives a variety of information from an external source. According to an example embodiment, the communicator 110 may receive a user command.

In this case, the user command received from an external source may be a signal for converting an operating mode.

According to another example embodiment, the communicator 110 may receive a user command to control an external electronic apparatus connected to the electronic apparatus 100 from a remote control apparatus. A detailed description on this operation will be provided below.

According to another example embodiment, the communicator 110 may receive a user interaction from the external source. Further, the communicator 110 may receive weather information from the external source. The received weather information may be displayed in the background screen.

The display 120 may display video data. Particularly, while the electronic apparatus 100 operates in the second operating mode, the display 120 may display the second content screen including a video content received from an external source (for example, a broadcasting station, a server, or Digital Versatile Disc (DVD)) and an object related to the video content. While the electronic apparatus 100 operates in the first operating mode, the display 120 may display the first content screen including a pre-stored background image. In this case, the first content screen may include at least one graphic object and a shadow of the at least one graphic object in the background image.

The memory 130 may store a program and data for controlling the electronic apparatus 100. Particularly, the memory 130 may store data on the rear background image of the electronic apparatus 100. In this case, the data on the background image may be acquired from an external apparatus (for example, a smart phone), but this is only an example for illustrative purpose. That is, the data on the background image may be acquired from a camera connected to the electronic apparatus 100.

Further, the memory 130 may store data about a change of at least one graphic object corresponding to a user interaction. By way of example, in response to receiving a first user interaction, the memory 130 may store data which is preset to increase the number of the graphic object, and in response to receiving a second user interaction, may store data which is preset to decrease the number of the graphic object. That is, the memory 130 may store a result corresponding to a predetermined user interaction (e.g., change of an object).

The processor 140 may control overall operations of the electronic apparatus 100. Particularly, in the first operating mode, the processor 140 may control the display 120 to generate the first content screen based on the data on the background image stored in the memory 130 and the user interaction received through the communicator 110. In this case, the first content screen may include at least one graphic object and the shadow corresponding to the at least one graphic object in the background image.

The processor 140 may control the display 120 to generate a content screen based on the data on the background image stored in the memory 130 and sensing data acquired by a sensor and display the generated content screen. The content screen may include at least one graphic object and the shadow of at least one graphic object in the background image. In this case, at least one from among a position and a shade of the shadow may be changed in response to a change of the sensing data.

In response to the electronic apparatus 100 being realized to include a bezel and an outer frame covering the bezel on an edge thereof, the processor 140 may control the display 120 to further display a shadow of the outer frame in a region corresponding to the outer frame on an edge of the first content screen. In this case, the processor 140 may generate a background image layer including an object layer with at least one graphic object, a shadow layer with a shadow, and a background image layer with a background image to generate the first content screen. The object layer may be acquired from the external source or generated from pre-stored data, and the shadow layer may be generated based on the object layer. The background image layer may be generated from the data on the background image stored in the memory 130. The processor 140 may generate a plurality of object layers or background image layers. Further, the processor 140 may further generate an outer frame shadow layer with a shadow of the outer frame.

Particularly, the processor 140 may control the display 120 to arrange the layers to be displayed in front in the order of the object layer, the shadow layer, and the background image layer. In response to the outer frame shadow layer being generated, the processor 140 may control the display 120 to display the outer frame shadow layer ahead of the object layer.

In this case, the processor 140 may further generate an interaction layer. The interaction layer may display an interaction object generated based on the user interaction. That is, the processor 140 may generate the interaction layer to display the interaction object corresponding to the user interaction.

However, operation of the processor 140 is not limited to the above example. The processor 140 may display the interaction object corresponding to the user interaction in the object layer. As an example, in response to receiving a first user interaction, the processor 140 may display a first interaction object corresponding to the first interaction in the object layer. That is, in response to the interaction object being displayed in the object layer, the graphic object may include the interaction object. In response to the interaction object being displayed in the interaction layer, the graphic object and the interaction object may be different objects.

The processor 140 may control the display 120 to change at least one from among a size, the number, a position, a color, and brightness of the graphic object in response to the user interaction. In response to the graphic object being changed, the processor 140 may change a shadow corresponding to the changed graphic object.

The processor 140 may generate the interaction object corresponding to the user interaction and change the graphic object in response to the user interaction, but example embodiments are not limited thereto. The processor 140 may generate the interaction object corresponding to the user interaction and change the graphic object in response to the interaction object.

In response to receiving a user command to convert the operating mode, the processor 140 may control the display 120 to display the content screen corresponding to the changed operating mode.

The processor 140 may control the display 120 to display the first content screen corresponding to the first operating mode. In this case, in response to receiving a user command to convert the first operating mode to the second operating mode, the processor 140 may control the display 120 to decrease resolution of the first content screen and display the content layer including the content image in a certain region of the first content screen.

The processor 140 may decrease resolution of at least one from among the object layer, the background image layer, and the shadow layer included in the second content screen, but example embodiments are not limited thereto. That is, the processor 140 may remove a certain layer. By way of example, in response to receiving the user command to convert the first operating mode to the second operating mode, the processor 140 may remove the shadow layer and decrease the resolution of at least one from among the object layer and the background image layer.

The processor 140 may control the display 120 to enlarge the content image displayed in the content layer. In response to the content image being enlarged to be of equal size to the first content screen, the processor 140 may control the display 120 to remove the first content screen and display the second content screen including the enlarged content image. The second content screen may further include a content object layer as well as the content layer.

In this case, the resolution of the second content screen may be higher than the decreased resolution of the first content screen. That is, in response to receiving a user command to display the second content screen, the processor 140 may decrease the resolution of the first content screen to improve a processing speed.

The processor 140 may control the display 120 to display the first content screen corresponding to the second operating mode. In response to receiving a user command to convert the second operating mode to the first operating mode, the processor 140 may control the display 120 to decrease the resolution of the second content screen and display the object layer with the graphic object in a certain region of the second content.

In this case, the processor 140 may decrease the resolution of at least one from among the content layer and the content object layer included in the first content layer. However, as described above, in response to receiving the user command to convert the second operating mode to the first operating mode, the processor 140 may remove the content object layer and decrease the resolution of the content layer.

The processor 140 may control the display 120 to enlarge the content image displayed in the content layer. In response to the content image being enlarged to be of equal size to the first content screen, the processor 140 may control the display 120 to remove the first content screen and display the second content screen including the enlarged content image. The second content screen may further include the content object layer as well as the content layer.

In this case, the resolution of the second content screen may be higher than the decreased resolution of the first content screen. That is, in response to receiving the user command to display the second content screen, the processor 140 may decrease the resolution of the first content screen to improve the processing speed.

Figure 3:
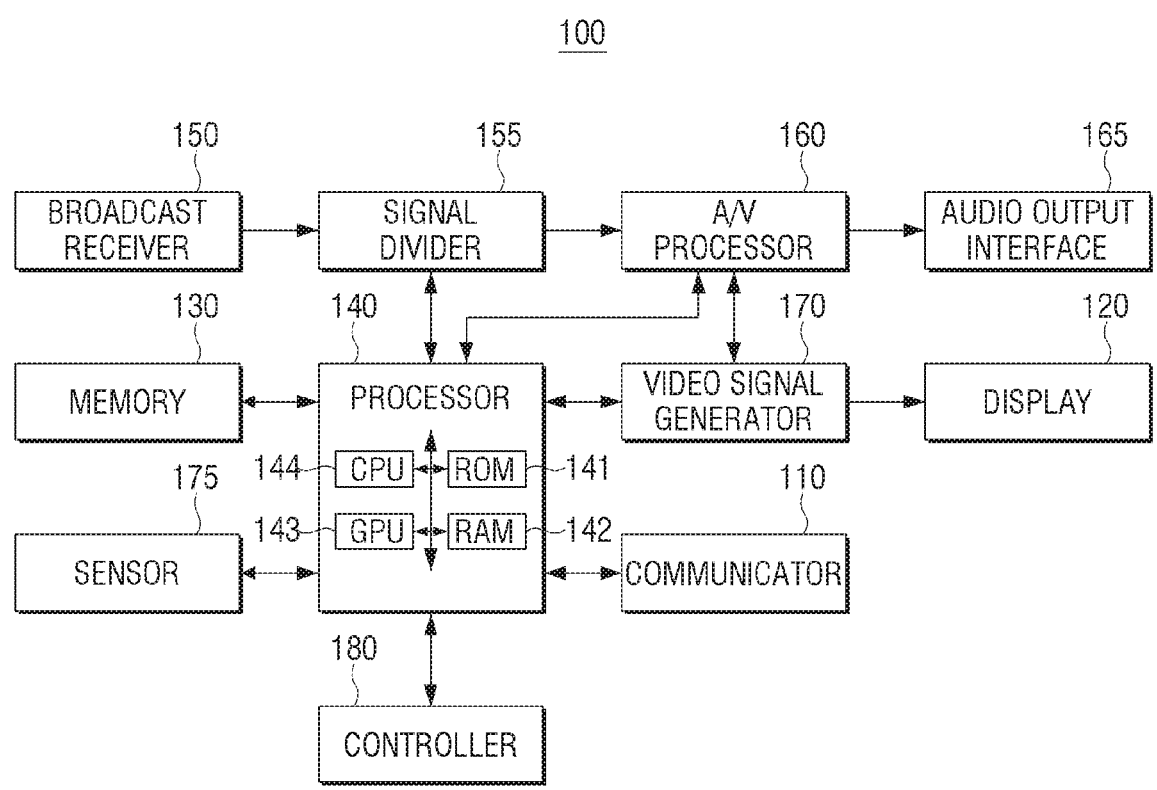
FIG. 3 is a block diagram illustrating a detailed structure of an electronic apparatus, according to an example embodiment.

FIG. 3 is a block diagram illustrating a detailed structure of an electronic apparatus, according to an example embodiment. Referring to FIG. 3, an electronic apparatus 100 according an example embodiment may include a communicator 110, a display 120, a memory 130, a processor 140, a broadcast receiver 150, a signal divider 155, and audio/video (A/V) processor 160, an audio output unit 165 (e.g., audio output interface), a video signal generator 170, a sensor 175, and a controller 180.

However, the structure of the electronic apparatus 100 is not limited to the above example, and components may be added, omitted, or integrated. As an example, the processor 140 may be realized to include the signal divider 155, the A/V processor 160, and the video signal generator 170. In this case, the processor 140 may perform functions and operations of the A/V processor 160 and the video signal generator 170. A detailed description on the A/V processor 160 and the video signal generator 170 will be provided below. The communicator 110 communicates with various types of external apparatuses according to diverse communication methods. The communicator 110 may include a Wireless-Fidelity (Wi-Fi) chip and a Bluetooth chip. The processor 140 may communicate with various types of external apparatuses through the communicator 110. To be specific, the communicator 110 may receive a control command or a user interaction from a control terminal apparatus (for example, a smart phone or a remote controller) that controls the electronic apparatus 100.

In this case, the user interaction may be inputted by the external apparatus. For example, the user interaction may be inputted through an external electronic apparatus, such as a smart phone.

The external electronic apparatus may detect the user interaction and transmit data on the detected user interaction to the electronic apparatus 100, but example embodiments are not limited thereto. The electronic apparatus 100 may detect the user interaction directly. In this case, the user interaction may have various forms and may be detected by various methods. As an example, the user interaction may be a doodle interaction. The doodle interaction refers to an interaction of drawing a picture on a drawing board, but example embodiments are not limited to the term 'doodle.' This interaction may be called various names, such as a picture interaction, a writing interaction, etc. As another example, the user interaction may be a user motion (e.g., a gesture). The external electronic apparatus or the electronic apparatus 100 may recognize the user motion through a camera sensor or the like. As still another example, the user interaction may be a voice command. The external electronic apparatus or the electronic apparatus 100 may recognize a user voice through a microphone. The user interaction may have various forms as described above, but in the following description, the user interaction will refer to the doodle interaction. However, aspects of the present disclosure may be applied to various other interactions.

The electronic apparatus 100 may generate an interaction object corresponding to a user interaction and change a graphic object. In this case, the interaction object may be a doodle image as illustrated in FIGS. 7B, 8B, and 9B.

The communicator 110 may acquire weather information through communication with an external server. The processor 140 may generate a background image by using the weather information acquired through the communicator 110.

The communicator 110 may further include a Universal Serial Bus (USB) port for a USB connector, diverse input ports for various external terminals, such as a headset, a mouse, or Local Area Network (LAN), or a Digital Multimedia Broadcasting (DMB) chip for receiving and processing a DMB signal, according to an example embodiment.

The display 120 may display an image. The display 120 may be realized as various types of displays, such as Liquid Crystal Display (LCD), Plasma Display Panel (PDP), and so on. The display 120 may further include a driver circuit that may be realized as an amorphous-silicon Thin Film Transistor (a-si TFT), Low Temperature Poly Silicon (LTPS), Thin Film Transistor (TFT), or organic TFT (OTFT), and a backlight unit. The display 120 may be realized as a touch screen in combination with a touch sensor.

The display 120 may include a backlight. In this case, the backlight may be a point light source consisting of a plurality of light sources. The backlight supports local dimming.

The light sources of the backlight may be formed with a Cold Cathode Fluorescent Lamp (CCFL) or a Light Emitting Diode (LED). In the following description, the backlight consists of the LED and an LED driver circuit, but the backlight may include the light sources other than the LED in the implementation. The plurality of light sources of the backlight may be arranged in various forms, and diverse local dimming methods may be applied. As an example, the backlight may be a direct type backlight in which the plurality of light sources are arranged in the entire LCD screen evenly in a matrix form. In this case, the backlight may operate as Full-Array local dimming or as the Direct local dimming. The Full-Array local dimming refers to a dimming method in which the light sources are arranged evenly behind the LCD screen, and brightness is adjusted for each light source. The Direct local dimming is similar to the Full-Array local dimming, but the brightness is adjusted for each light source for the fewer number of light sources.

Further, the backlight may be an Edge type backlight in which the plurality of light sources are arranged on only an edge portion of the LCD screen. In this case, the backlight may operate as Edge-lit local dimming. In case of the Edge-lit local dimming, the plurality of light sources may be arranged on only an edge portion, only a left/right portion, only an upper/lower portion, or only a left/right/upper/lower portion of a panel.

Particularly, the display 120 may display the first content screen including the background image. In this case, the first content screen may include the object layer with at least one graphic object, the shadow layer with a shadow of the at least one graphic object, and the background image layer with the background image.

The electronic apparatus 100 may drive the display 120 with a first frequency (for example, 120 Hz or 240 Hz) in the second operating mode and drive the display 120 with a second frequency lower than the first frequency (for example, 60 Hz) in the first operating mode. That is, the electronic apparatus 100 may drive the display 120 with the lower frequency in the first operating mode, thereby minimizing power consumption.

The broadcast receiver 150 may receive a broadcast from a broadcasting station or from a satellite in a wired and/or wireless manner and demodulate the received broadcast. To be specific, the broadcast receiver 150 may receive a transport stream through an antenna or a cable, demodulate the received transport stream, and output a digital transport stream signal.

The signal divider 155 may divide the transport stream signal received from the broadcast receiver 150 to a video signal, an audio signal, and an additional information signal. Subsequently, the signal divider 155 may transmit the video signal and the audio signal to the A/V processor 160.

The A/V processor 160 may perform a signal-processing operations, such as video decoding, video scaling, or audio decoding, to the video signal and the audio signal received from the broadcast receiver 150 and the memory 130. The A/V processor 160 may output the video signal to the video signal generator 170 and output the audio signal to the audio output unit 165. In this case, an image outputted through the video signal generator 170 may be a content image by the second operating mode (e.g., normal mode).

Further, to store the received video and audio signals in the memory 130, the A/V processor 160 may output the video and audio to the memory 130 in a compressed form.

The audio output unit 165 may convert the audio signal outputted from the A/V processor 160 to sound and output the converted sound through a speaker or output the converted sound to a connected external apparatus through an external output terminal.

The video signal generator 170 may generate a Graphic User Interface (GUI) for a user. The video signal generator 170 may add the generated GUI to the image outputted from the A/V processor 160. Subsequently, the video signal generator 170 may transmit a video signal corresponding to the image with the GUI to the display 120. Accordingly, the display 120 may display various information provided by the electronic apparatus 100 and the image received from the video signal generator 170.

The video signal generator 170 may process and output the content screen generated by the processor 140. To be specific, the video signal generator 170 may output a plurality of layers without changing or synthesizing (e.g., merging) the plurality of layers and provide the display 120 with the layers.

The memory 130 may store various data and programs for controlling the electronic apparatus 100. Further, the memory 130 may receive and store the video content where the video and audio are compressed from the A/V processor 160 and output the stored video content to the A/V processor 160 according to control of the processor 140. Particularly, the memory 130 may store the data on the background image.

The memory 130 may be realized as a hard disc, a non-volatile memory, a volatile memory, and/or the like.

The controller 180 may be realized as a touch screen, a touch pad, a key button, a key pad, and so on. The controller 180 may provide user manipulation of the electronic apparatus 100. According to an example embodiment, a control command is received through the controller 180 of the electronic apparatus 100, but the controller 180 may receive user manipulation from the external control apparatus (for example, a remote controller).

The sensor 175 may sense a user interaction. That is, the user interaction may be received from the external electronic apparatus as described above or sensed by the sensor 175.

According to an example embodiment, the sensor 175 may be a camera sensor for sensing a user motion. In response to sensing the user motion through the camera sensor, the processor 140 may generate an interaction object corresponding to the sensed user motion and change a graphic object.

According to another example embodiment, the sensor 175 may be a touch sensor for sensing a user touch input. As described above, the touch sensor may form a touch panel in combination with the display 120. In response to receiving a user interaction through the touch panel, the processor 140 may generate an interaction object corresponding to the sensed user interaction and change a graphic object.

According to another example embodiment, the sensor 175 may generate sensing data on at least one from among a direction and luminous intensity of an external light projected onto the display from an external light source around the display 120.

Particularly, the sensor 175 may include a plurality of sensors spaced apart from each other on the display 120. In the implementation, the sensor 175 may be formed with two sensors or formed with four or more sensors. In this case, the sensor may be an illumination sensor for sensing the illumination intensity, a color sensor for sensing the illumination intensity and a color temperature, a camera for photographing an image, or the like. The sensors may be embedded in the outer frame of the display 120 to not be affected by the light emitted from the display 120. In response the sensor 175 being formed with two sensors, the two sensors may consist of one illumination sensor and one color sensor, two illumination sensors, or two color sensors.

The sensor 175 may further include various sensors, such as an Infrared Rays (IR) sensor, an ultrasonic sensor, a Radio Frequency (RF) sensor, and so on. In this case, at least one sensor 110 may sense a location of an external user or external object through the various sensors.

The processor 140 controls overall operations of the electronic apparatus 100. To be specific, in the second operating mode, the processor 140 may control the video signal generator 170 and the display 120 to display an image according to a control command received through the controller 180.

The processor 140 may be realized as a System on Chip (SoC) including a Read-Only Memory (ROM) 141, a Random Access Memory (RAM) 142, a Graphic Processing Unit (GPU) 143, a Central Processing Unit (CPU), and a bus. In this case, the ROM 141, the RAM 142, the GPU 143, and the CPU 144 may be interconnected through the bus.

The CPU 144 may access the memory 130 and perform a boot-up operation by using an Operating System (O/S) in the memory 130. Further, the CPU 144 may perform various operations using diverse programs, contents, and data stored in the memory 130.

The ROM 141 may store a command set for system booting. In response to the power being supplied by a turn-on command, the CPU 144 may copy the O/S in the memory 130 to the RAM 142 according to the commands stored in the ROM 141, and boot up the system by executing the O/S. Upon completion of the boot-up operation, the CPU 144 may copy various application programs in the memory 130 to the RAM 142 and execute the programs copied to the RAM 142 to perform various operations.

Upon completion of the boot-up operation, the GPU 143 may generate a screen including various objects, such as icons, images, text, or the like. To be specific, in response to the electronic apparatus 100 operating in the first operating mode, the GPU 143 may generate the first content screen including the graphic object and the shadow of the graphic object in the background image. In this case, as described above, the screen including various objects generated by the GPU 143 may be outputted through the video signal generator 170.

The GPU may be realized as a separate component, such as the video signal generator 170, or realized as a SoC in combination with a CPU in the processor 140.

The processor 140 may be realized separately from the ROM, the RAM, and the GPU and may operate with other processor and memory.

While the electronic apparatus 100 operates in the first operating mode, the processor 140 may control the display 120 to generate and display the first content screen based on the data on the background image stored in the memory 130 and the sensing data acquired by the sensor 175. The first content screen may include at least one graphic object and a shadow corresponding to the at least one graphic object in the background image. In this case, at least one from among the position and the shade of the shadow may be changed in response to a change of the sensing data.

Further, while the electronic apparatus 100 operates in the first operating mode, the processor 140 may control the display 120 to generate and display the first content screen based on the data on the background image stored in the memory 130 and the user interaction received through the communicator 110.

In response to receiving a command to convert an operating mode, the processor 140 may control the display 120 to display a content screen corresponding to the converted operating mode. In this case, the processor 140 may decrease or remove the resolution of the content screen to improve the processing speed.

Figure 4A:
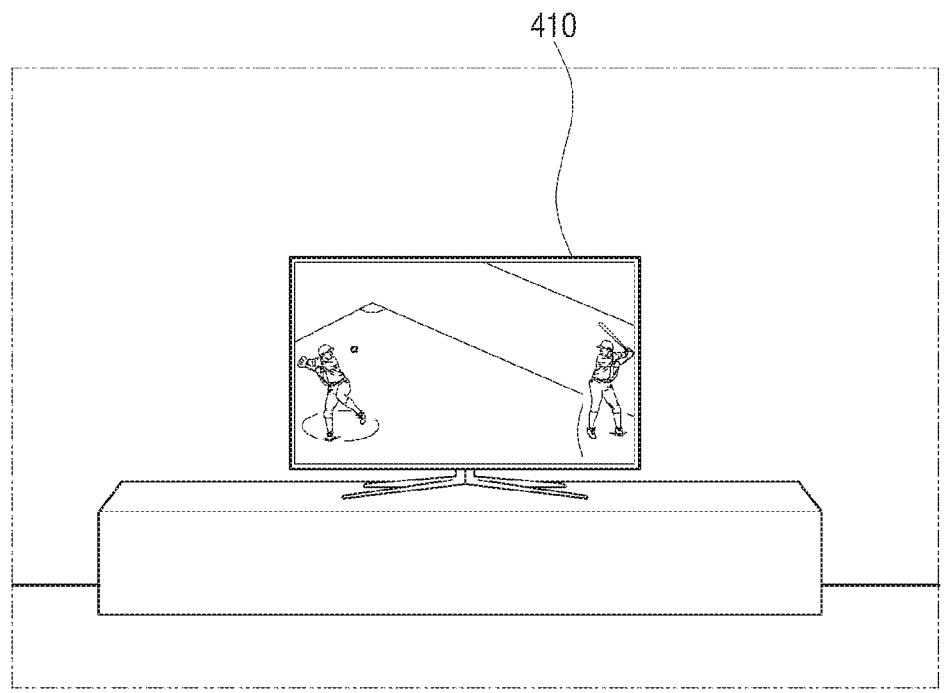
FIGS. 4A and 4B are diagrams illustrating a first operating mode (e.g., background mode) and a second operating mode (normal mode or content mode) of an electronic apparatus, according to an example embodiment.
Figure 4B:
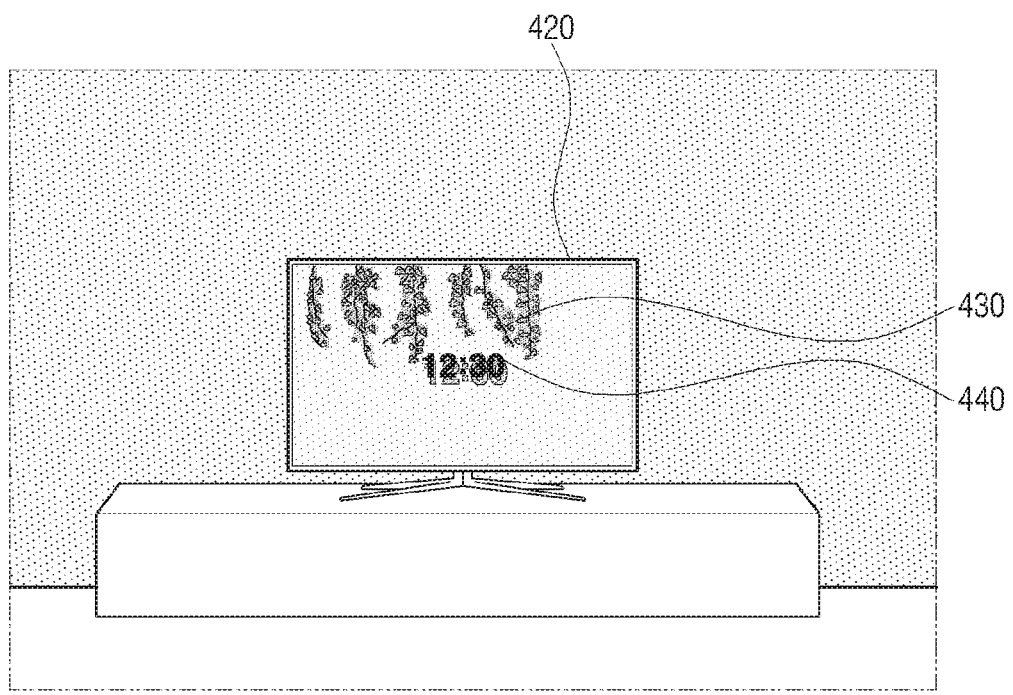

FIGS. 4A and 4B are diagrams illustrating a second operating mode and an electronic apparatus 100 operating in the second operating mode.

While the electronic apparatus 100 operates in the second operating mode (e.g., normal mode), the processor 140 may control the display 120 to display the second content screen including the video content received from the external source or a pre-stored video content and a content object. By way of example, as illustrated in FIG. 4A, the processor 140 may control the display 120 to display a broadcast content 410 received through a tuner.

In response to receiving a predetermined user command (for example, a command to select a certain button of a remote controller) or sensing a predetermined event (for example, an event of sensing a user while the display 120 is turned off) while the electronic apparatus 100 operates in the normal mode, the processor 140 may convert the operating mode of the electronic apparatus 100 from the second operating mode to the first operating mode (e.g., background mode).

While the electronic apparatus 100 operates in the first operating mode, the processor 140 may control the display 120 to display the first content screen including the background image based on the data on the pre-stored background image and the user interaction received through the communicator 110. In this case, as illustrated in FIG. 4B, the first content screen may include a vine object 430, a shadow corresponding to the vine object, a clock object 440, and a shadow corresponding to the clock object in the background image 420, but example embodiments are not limited thereto. The background image 420 may include various objects, such as a tree object, a fishbowl object, a note object, and so on, and a shadow corresponding to each object.

FIGS. 5A to 5D are demonstration diagrams illustrating various layers generated by a processor, according to an example embodiment.

To be specific, the processor 140 may generate a background image layer 510, a shadow layer 520, and an object layer 530. In this case, as illustrated in FIG. 5A, the processor 140 may control the display 120 to arrange the layers to be displayed in front in the order of the background image layer 510, the shadow layer 520, and the object layer 530.

Figure 5A:
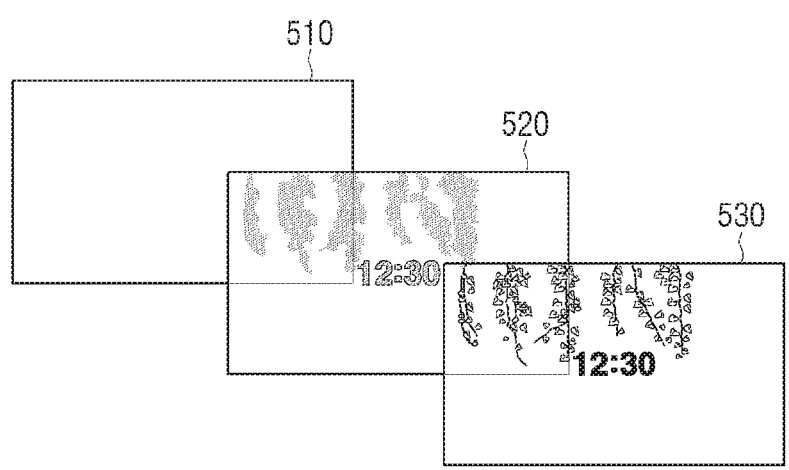
FIGS. 5A to 5D are demonstration diagrams illustrating various layers generated by a processor, according to an example embodiment.

In FIG. 5A, the processor 140 generates one object layer 530 and one shadow layer 520, but this is only an example for illustrative purpose. The processor 140 may generate a plurality of object layers and shadow layers.

By way of example, the processor 140 may generate an object layer with a clock object and an object layer with a vine object. Further, the processor 140 may generate a shadow layer corresponding to each object. In response to generating a plurality of object layers, the processor 140 may control the display 120 to arrange the object layer with an object to be seen in front of other layers. For instance, in response to generating the object layer with the clock object and the object layer with the vine object, the processor 140 may control the display 120 to display the object layer with the clock object ahead of the object layer with the vine object.

Figure 5B:
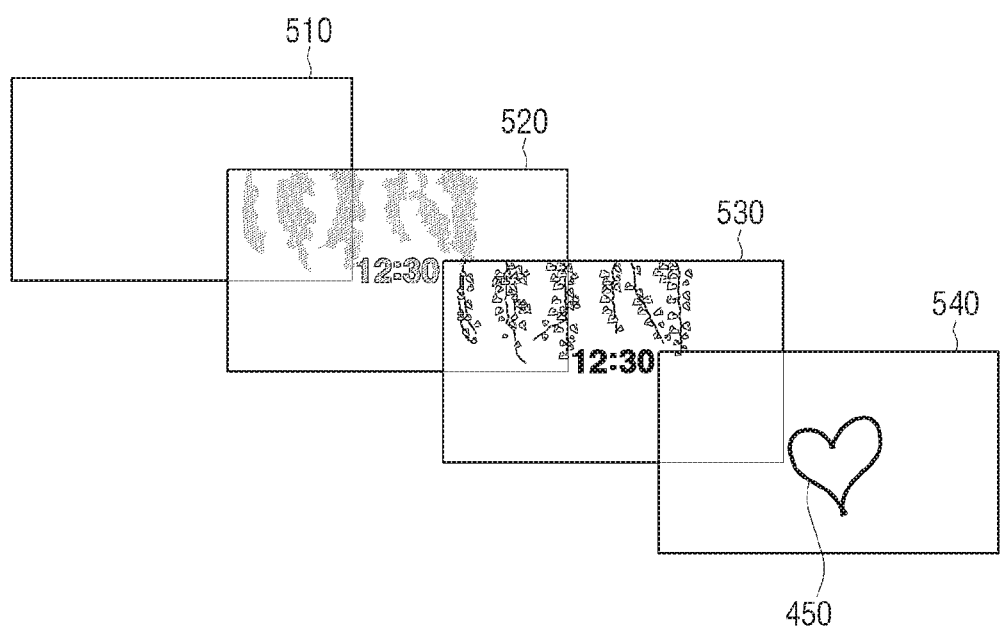

In the same manner, as illustrated in FIG. 5B, the processor 140 may further generate an interaction layer 540. As illustrated in FIG. 5B, the interaction layer 540 may include an interaction object 450 corresponding to a user interaction. In this case, the processor 140 may control the display 120 to arrange the interaction layer 540 ahead of the object layer 530 such that the interaction object 540 is displayed ahead of the clock object and the vine object, but this is only an example for illustrative purpose. The interaction layer 540 may be generated behind the object layer 530.

The interaction object may be displayed in one object layer. That is, as illustrated in FIG. 5C, the object layer may include all of the vine object, the clock object, and the interaction object.

Figure 5C:
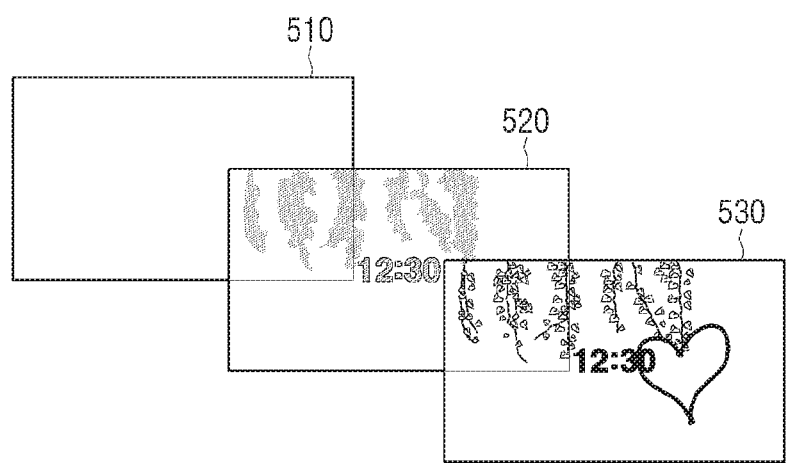
Figure 5D:
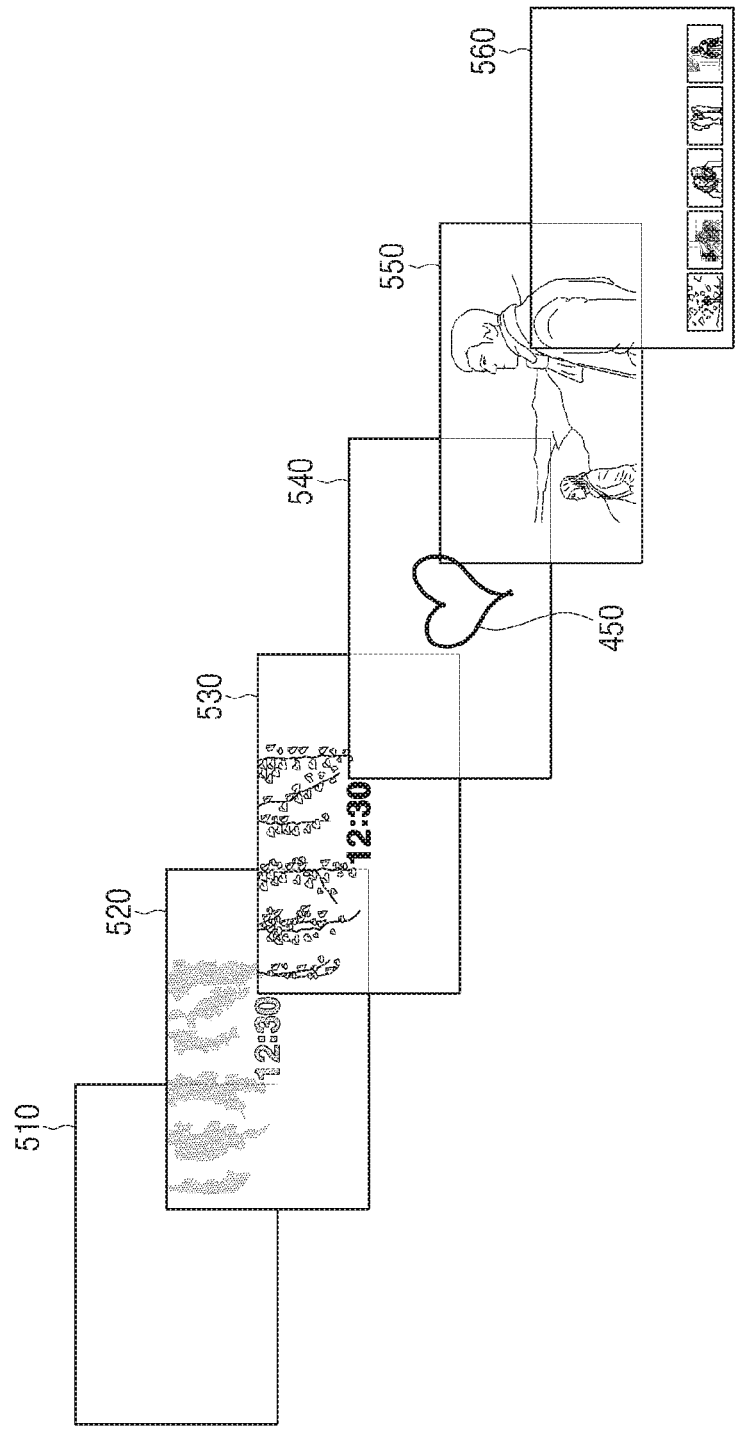

In this case, the layers described in FIGS. 5A to 5C may be the layers mainly displayed in the first operating mode. However, as illustrated in FIG. 5D, the processor 140 may further include a content layer 550 and a content object layer 560 displayed in the second operating mode.

In response to the electronic apparatus 100 being realized to include a bezel and an outer frame on an edge of the display 120, the processor 140 may further include an outer frame shadow layer corresponding to a shadow of the outer frame.

[Example Embodiment: The First Content Screen Corresponding to a User Interaction when the Electronic Apparatus 100 Operates in the First Operating Mode]

Hereinafter, the operations of the processor 140 when a user interaction is received through a communicator while the electronic apparatus 100 operates in the first operating mode will be described in detail with reference to FIGS. 6A to 9B.

Figure 6A:
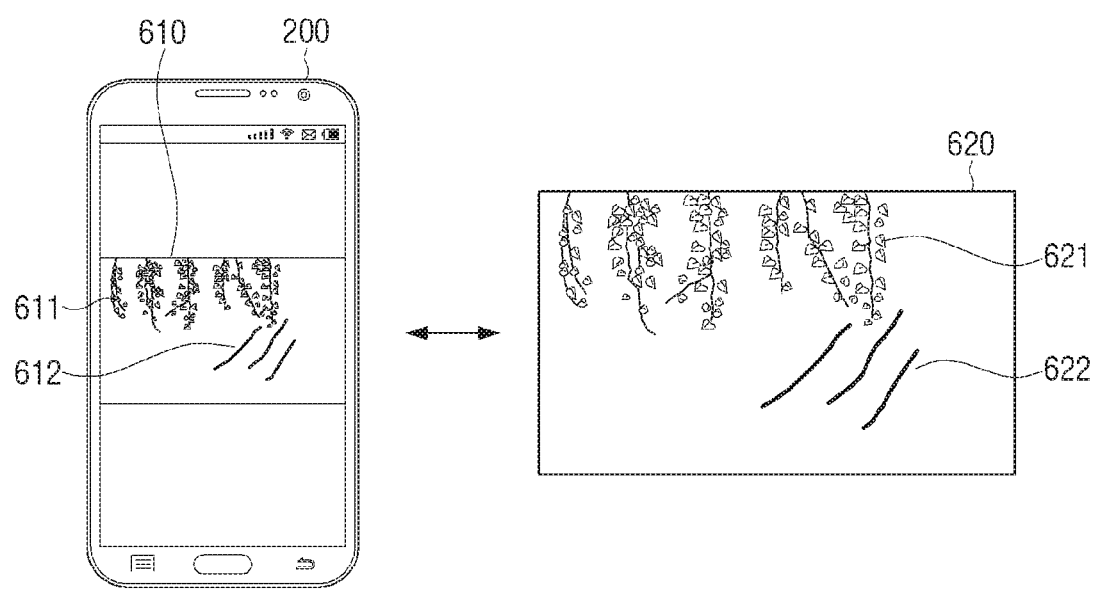
FIGS. 6A and 6B are diagrams provided to describe a user interaction according to an example embodiment.
Figure 6B:
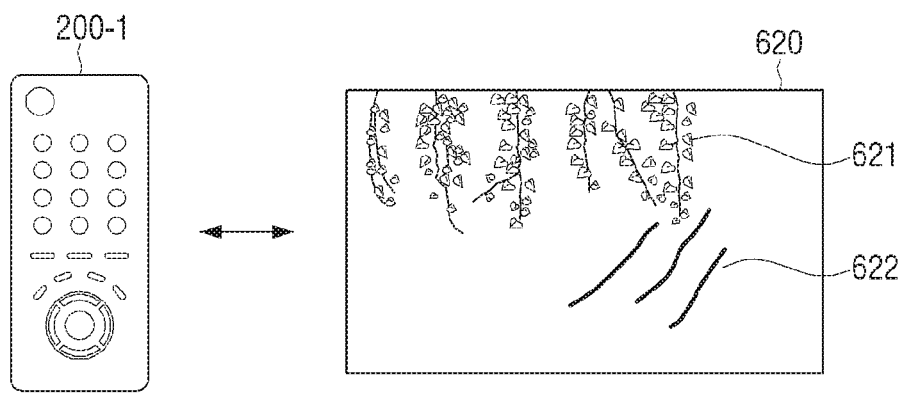

FIGS. 6A and 6B are diagrams provided to describe a user interaction according to an example embodiment.

As illustrated in FIG. 6A, an object layer of the electronic apparatus 100 may include a vine object 621. The electronic apparatus 100 may receive a user interaction from a remote control apparatus 200.

To be specific, in response to the remote control apparatus 200 being realized as a smart phone, the remote control apparatus 200 may receive information on a content image 620 displayed in the electronic apparatus 100. The remote control apparatus 200 that received the information on the content image 620 may display a content image 610 which is the same as the content image displayed in the electronic apparatus 100, including vine object 611.

The electronic apparatus 100 may receive a user interaction sensed by an remote control apparatus 200. As an example, a user may perform a doodle operation 612 of drawing a picture on the content image 610 displayed in the remote control apparatus 200. In this case, the user interaction may be a doodle interaction. The remote control apparatus 200 may transmit data corresponding to the interaction object 612 to the electronic apparatus 100 while displaying an interaction object 612 corresponding to the received user interaction in the display. Further, the electronic apparatus 100 may display an interaction object 622 corresponding to the data received from the remote control apparatus 200 in the display 120. In this case, the electronic apparatus 100 may generate an interaction layer including the interaction object 620, but this is only an example for illustrative purpose. The electronic apparatus 100 may generate the interaction object 622 in the object layer.

As illustrated in FIG. 6B, the user interaction may be inputted through a remote controller 200-1. In this case, the remote controller 200-1 may be realized as a pointing device. The electronic apparatus 100 may receive a user interaction by sensing a point pointed by the remote controller 200-1. Further, the electronic apparatus 100 may display the interaction object 622 corresponding to a user interaction using the remote controller 200-1 in the interaction layer.

In the above example embodiment, the electronic apparatus 100 displays the interaction object by using the smart phone 200 or the remote controller 200-1, but example embodiments are not limited thereto. As described above, the electronic apparatus 100 may sense the user interaction by various methods. By way of example, the electronic apparatus 100 may sense the user interaction by using a touch panel of the electronic apparatus 100 or by using other various sensors.

The remote control apparatus 200 may perform diverse functions on top of the above-described functions. A detailed description on the functions of the remote control apparatus 200 will be provided below with reference to FIGS. 15 to 22.

FIGS. 7A to 9B are demonstration diagrams illustrating examples in which a graphic object is changed in response to a user interaction.

Figure 7A:
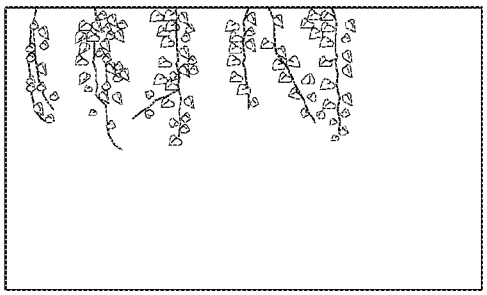
FIGS. 7A to 9B are demonstration diagrams illustrating examples in which a graphic object is changed in response to a user interaction.
Figure 7B:
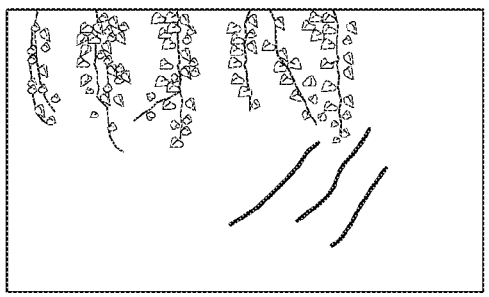
Figure 7C:
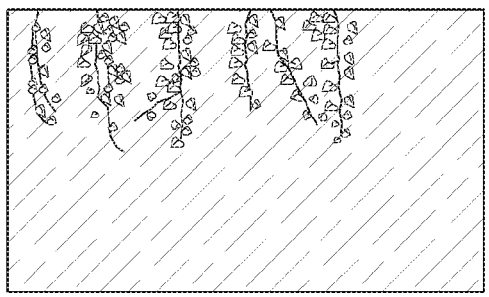

FIGS. 7A to 7C are demonstration diagrams provided to describe examples in which a vine object displayed in an electronic apparatus 100 is changed in response to a user interaction.

As illustrated in FIG. 7A, the object layer of the electronic apparatus 100 may include a vine object. In response to receiving a user interaction, the electronic apparatus 100 may display an interaction object corresponding to the user interaction in an interaction layer. To be specific, as illustrated in FIG. 7B, the interaction object may be in the shape of three lines (川).

The electronic apparatus 100 may change an object of the object layer corresponding to the user interaction. To be specific, as illustrated in FIG. 7C, as the interaction object displayed in the electronic apparatus 100 disappears, a plurality of raindrop objects may be added to the object layer for an effect of raining in the display 120. In this case, the electronic apparatus 100 may control the display 120 to remove the interaction object as soon as the plurality of raindrop objects are added, but example embodiments are not limited thereto. The plurality of raindrop objects and the interaction object may be displayed at the same time. Further, the interaction object may disappear first, and then the plurality of raindrop objects may be displayed.

Figure 8A:
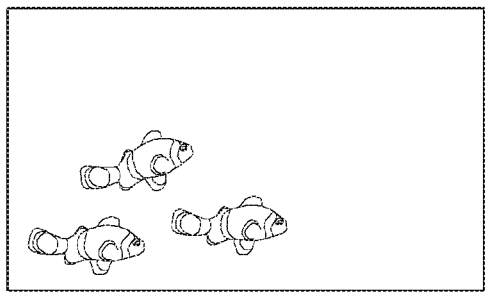
Figure 8B:
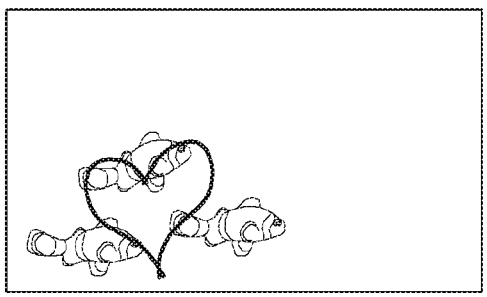
Figure 8C:
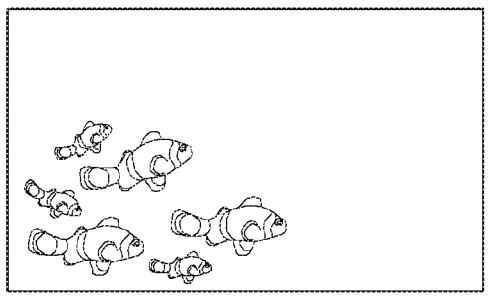

FIGS. 8A to 8C are demonstration diagrams illustrating examples in which a plurality of fish objects displayed in the electronic apparatus 100 are changed in response to a user interaction.

As illustrated in FIG. 8A, the object layer of the electronic apparatus 100 may include a plurality of objects. In response to receiving a user interaction, the electronic apparatus 100 may display an interaction object corresponding to the user interaction in the interaction layer. To be specific, as illustrated in FIG. 8B, the interaction object may be a doodle in the shape of a heart.

The electronic apparatus 100 may change the object of the object layer in response to the user interaction. To be specific, as illustrated in FIG. 8C, as the interaction object displayed in the electronic apparatus 100 disappears, a plurality of baby fish objects may be added to the object layer for an effect of the plurality of fishes giving birth.

In the above example embodiment, the object is added in response to the user interaction, but example embodiments are not limited thereto. The object may be removed, changed, or moved in response to the user interaction. According to another embodiment, at least one from among a size, the number, a position, a color, and brightness of the object may be changed in response to the user interaction.

The change of an object in response to the user interaction may have been programmed and stored in the memory 130. That is, in response to sensing the first user interaction with respect to the first content screen displaying the vine object, the electronic apparatus 100 may add the plurality of raindrop objects. In response to sensing the second user interaction with respect to the first content screen displaying the fish objects, the electronic apparatus 100 may add the baby fish objects. This operation may have been programmed and stored in advance, but example embodiments are not limited thereto. The electronic apparatus 100 may determine whether to change an object in response to a sensed interaction through various machine learning. For this operation, an Artificial Intelligence (AI) algorithm, such as deep learning, may be employed.

By way of example, when the second user interaction is a doodle interaction of drawing a heart, the shape of the heart may vary depending on a user. In other words, although the user intended to draw a heart, the electronic apparatus 100 may not recognize the doodle of the user as a heart. In this case, the electronic apparatus 100 may determine the doodle of the user through learning. As an example, when a first user draws a heart with a winding open curve, the electronic apparatus 100 may not recognize a doodle with a round closed curve as a heart. As another example, when a second user draws a heart with a round closed curve, the electronic apparatus 100 may recognize a doodle with a winding open curve as a heart. Accordingly, the electronic apparatus 100 may determine the doodle intended by a user through the machine learning (for example, whether it is a heart or a star).

Figure 9A:
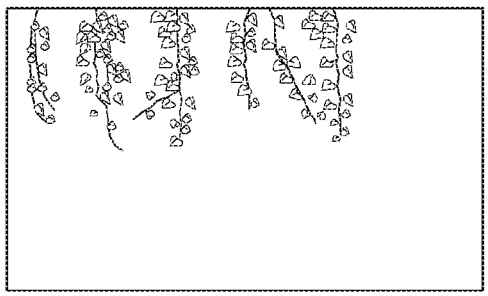
Figure 9B:
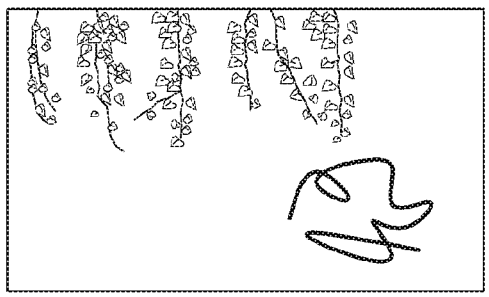

FIGS. 9A and 9B are demonstration diagrams provided to describe an example in which a change of an object in response to a user interaction is unavailable, according to an example embodiment.

In response to the memory 130 storing no function corresponding to the user interaction, the electronic apparatus 100 may not change an object image. By way of example, as illustrated in FIGS. 9A and 9B, in response to receiving a user interaction while the vine object is displayed in the object layer, the electronic apparatus 100 may display an interaction object corresponding to the user interaction in the interaction layer. In response to the memory 130 storing no command corresponding to the user interaction, the electronic apparatus 100 may maintain the layer displayed in the object layer. In this case, the interaction object may disappear after a predetermined time elapses, but example embodiments are not limited thereto. The interaction object may disappear in response to a user command to remove the interaction object.

Figure 10:
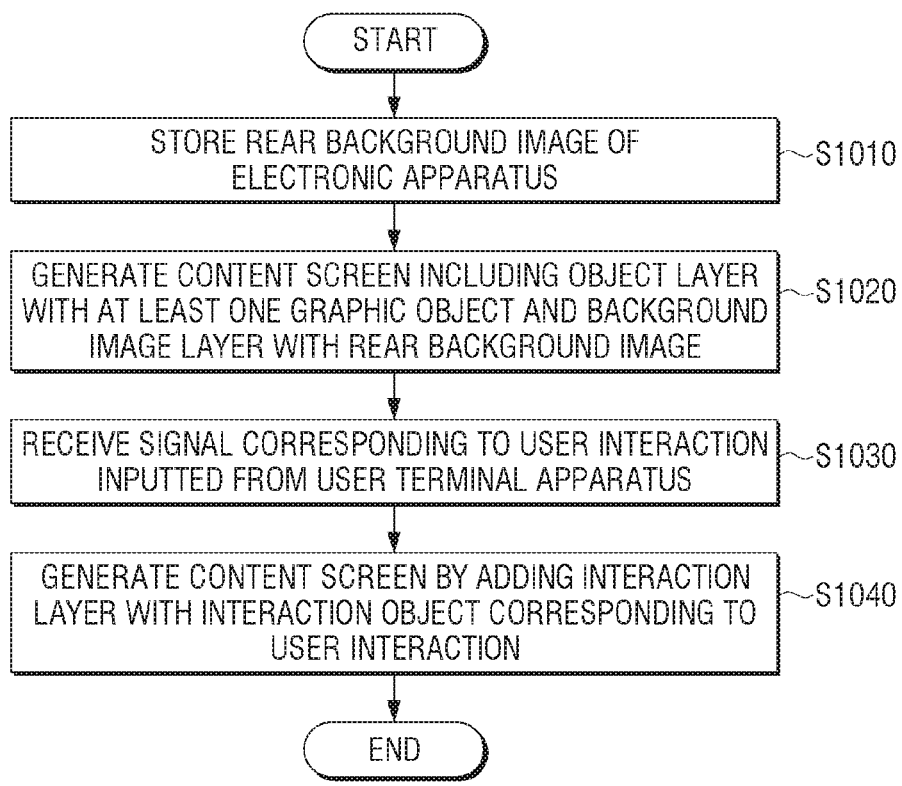
FIG. 10 is a flowchart illustrating a method for controlling an electronic apparatus according to an example embodiment.

FIG. 10 is a flowchart provided to describe a method for controlling an electronic apparatus according to an example embodiment.

An electronic apparatus 100 may store data to be displayed in a background image layer (S1010). In this case, the background image may be an image of a rear background of the electronic apparatus 100.

Subsequently, the electronic apparatus 100 may generate a content screen including an object layer with at least one graphic object and a background image layer with the rear background image (S1020). That is, the electronic apparatus 100 may display the rear background image in the background image layer and display the graphic object in the object layer. In this case, the generated content screen may be displayed in a display 120 or transmitted to an external display apparatus.

Subsequently, the electronic apparatus 100 may receive a signal corresponding to a user interaction through a communicator (S1030). As described above, the user interaction may be acquired from an external electronic apparatus, such as a smart phone or a remote controller, or acquired by sensing a user motion through a camera sensor.

In response to receiving the user interaction, the electronic apparatus 100 may generate the content screen by adding an interaction layer with an interaction object corresponding to the user interaction (S1040).

[Example Embodiment: A Change of a Layer Included in the Content Layer when Converting an Operating Mode]

FIGS. 11A to 14D are demonstration diagrams illustrating examples in which a layer included in each content screen is changed in response to an operating mode being converted.

FIGS. 11A to 11D are demonstration diagrams illustrating a change process of a display 120 in response to receiving a user command to convert from the first operating mode to the second operating mode.

Figure 11A:
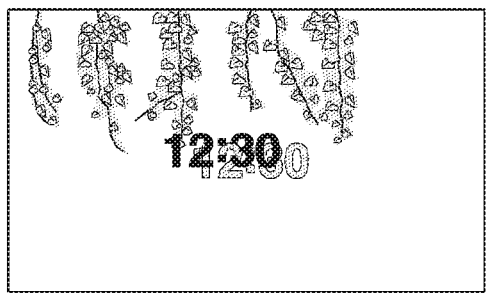
FIGS. 11A to 11D are demonstration diagrams illustrating a change process of a display in response to the first operating mode being converted to the second operating mode, according to an example embodiment.

As illustrated in FIG. 11A, a user command to convert an operating mode may be received while the first content screen is displayed. In this case, the user command may be inputted through a remote control apparatus 200 illustrated in FIG. 17

Figure 11B:
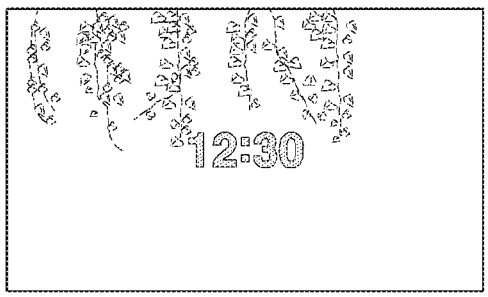

In response to receiving the user command, the electronic apparatus 100 may decrease or remove resolution of at least one from among an object layer, a background image layer, and a shadow layer included in the first content screen, as illustrated in FIG. 11B. By way of example, in response to receiving the user command while the object layer in the first content screen is displayed with first resolution, the electronic apparatus 100 may change the resolution of the object layer to second resolution and remove the shadow layer. In this case, the resolution of the background image layer may be maintained, and the first resolution may be higher than the second resolution. The first resolution and the second resolution may be determined properly according to a size of a display of the electronic apparatus 100. As an example, in response to the electronic apparatus 100 being realized with a 60-inch display, the first resolution may be 2560*1440, and the second resolution may be 1280*720. As another example, in response to the electronic apparatus 100 being realized with a 24-inch monitor, the first resolution may be 1920*1080, and the second resolution may be 960*540, but example embodiments are not limited thereto. That is, the first resolution and the second resolution may vary, for example, 1366*768, 3840*2160, and the like.

According to another example embodiment, in response to receiving the user command to convert the operating mode, the electronic apparatus 100 may remove all of the object layer, the background image layer, and the shadow layer. Further, the electronic apparatus 100 may remove two of the layers and decrease the resolution of the remaining layer. Further, the electronic apparatus 100 may remove one of the layers and decrease the resolution of the remaining two layers. Further, the electronic apparatus 100 may decrease the resolution of all of the three layers. In response to receiving the user command to convert the operating mode, the electronic apparatus 100 may decrease the resolution of the first content screen (including removal of the first content screen) according to the above-described method.

Figure 11C:
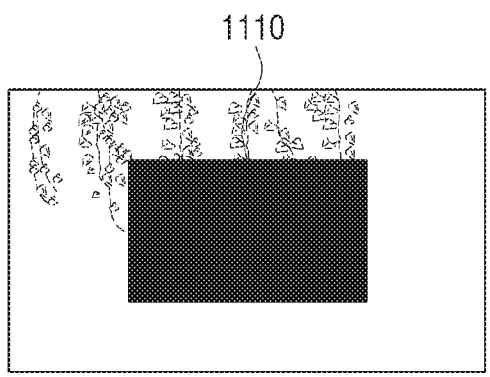

The processor 140 may control the display 120 to display a content layer in a certain region 1110 of the first content screen while decreasing the resolution of the second content screen. To be specific, as illustrated in FIG. 11C, the processor 140 may control the display 120 to display the content layer including the content image in a center region of the first content screen. In this case, the content object layer may be generated after the second content screen is removed, but example embodiments are not limited thereto.

The processor 140 may display both of the content layer and the object layer in the certain region 1110 of the first content screen.

Figure 12A:
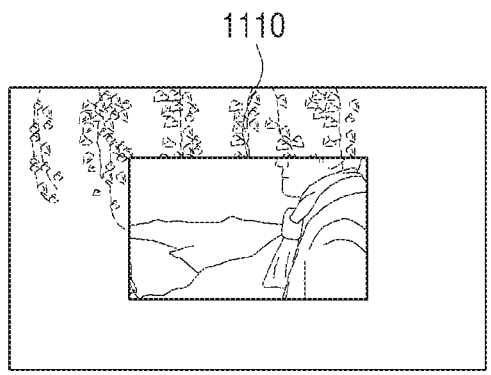
FIGS. 12A and 12B are demonstration diagrams illustrating a method for displaying a content screen corresponding to a converted operating mode when converting an operating mode, according to an example embodiment.
Figure 12B:
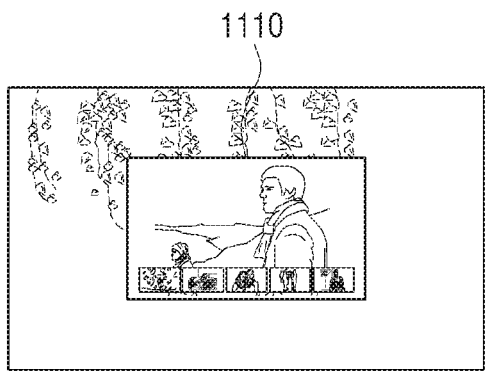

In this case, the content layer displayed in the certain region 1110 of the first content screen may be a part of the content image displayed in the second content screen. For example, as illustrated in FIG. 12A, only the content layer displayed in the certain region 1110 of the first content screen and a part of the second content screen corresponding to the certain region 1110 of the first content screen may be displayed. Further, as illustrated in FIG. 12B, the content layer displayed in the certain region 1110 of the first content screen may be an image of the second content screen reduced to correspond to a size of the certain region 1110. Further, as illustrated in FIG. 11C, the content layer displayed in the certain region 1110 of the first content screen may be a black screen or a white screen. Further, according to an example embodiment, in response to the certain region 1110 of the first content screen being enlarged to be of equal size to the display 120, the first content screen may be displayed.

Figure 11D:
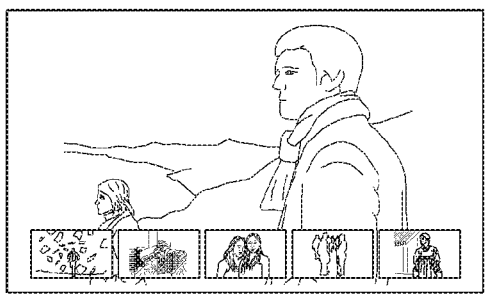

In response to the certain region 1110 of the first content screen being enlarged to be of equal size to the display 120, as illustrated in FIG. 11D, the electronic apparatus 100 may remove the first content screen and display the second content screen, but example embodiments are not limited thereto. That is, in response to the certain region 1110 of the first content screen being enlarged to be of a predetermined size, the electronic apparatus 100 may remove the second content screen.

While the certain region 1110 of the first content screen is enlarged, the resolution of at least one from among the object layer, the background image layer, and the shadow layer included in the first content screen may be decreased gradually. That is, the electronic apparatus 100 may decrease the resolution of the second content screen and the first content screen according to proportions of the second content screen and the first content screen in the display 120.

In FIGS. 11A to 12B or FIG. 13A, the certain region 1110 of the first content screen is generated in the center region of the display 120 and enlarged in upward, downward, right, and left directions, but example embodiments are not limited thereto.

Figure 13A:
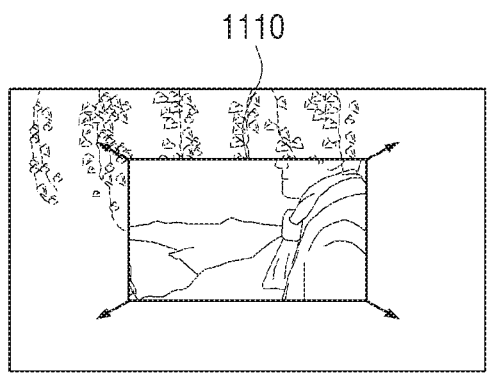
FIGS. 13A to 13C are demonstration diagrams illustrating a method for changing a display when converting an operating mode, according to an example embodiment
Figure 13B:
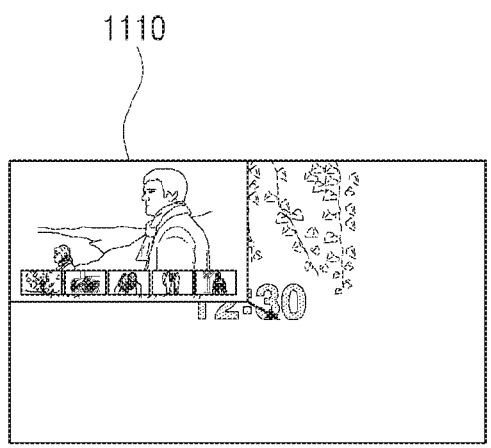

As illustrated in FIG. 13B, the certain region 1110 of the first content screen may be generated in an upper left end and enlarged towards a lower right end. In the same manner, the certain region 1110 of the first content screen may be generated in a lower left end and enlarged towards a upper right end. Additionally, the certain region 1110 of the first content screen may be generated in a lower right end and enlarged towards the upper left end. Also, the certain region 1110 of the first content screen may be generated in the upper right end and enlarged towards the lower left end.

Figure 13C:
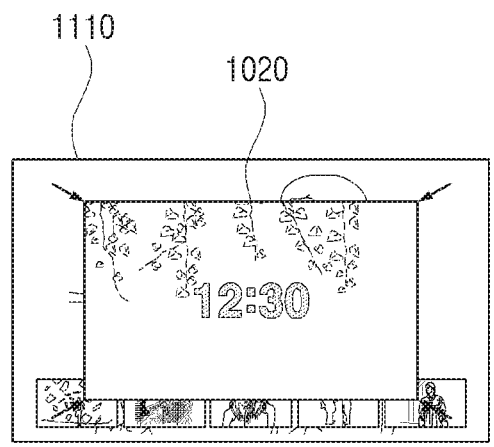

As illustrated in FIG. 13C, the certain region 1110 of the first content screen may be generated from an edge of the display 120 and reduce a first content screen 1020, but example embodiments are not limited thereto. The certain region 1110 of the first content screen may be generated and enlarged in various positions according to various patterns on top of the above-described patterns.

FIGS. 14A to 14D are demonstration diagrams illustrating a change of a display 120 in response to receiving a command to convert an operating mode while the second content screen is displayed.

Figure 14A:
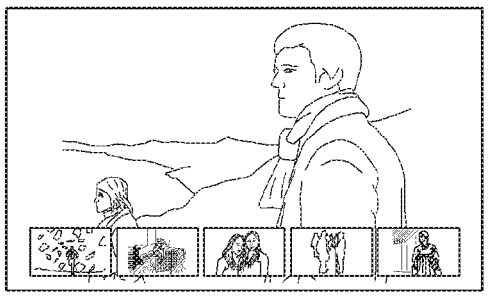
FIGS. 14A to 14D are demonstration diagrams illustrating a change process of a display in response to the second operating mode being converted to the first operating mode, according to an example embodiment.
Figure 14B:
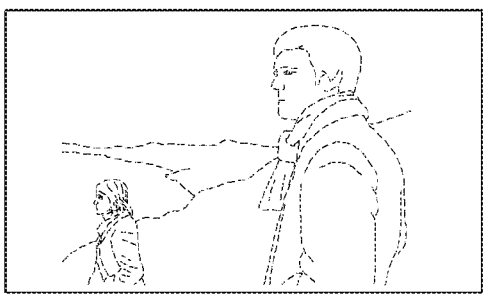

As illustrated in FIG. 14A, in response to receiving a user command to convert an operating mode while the second content screen is displayed, the electronic apparatus 100 may decrease the resolution of the content layer included in the second content screen and remove the content object layer as illustrated in FIG. 14B, but this is only an example for illustrative purpose. The electronic apparatus 100 may selectively decrease the resolution of at least one from among the content layer and the content object layer or remove the layer.

Figure 14C:
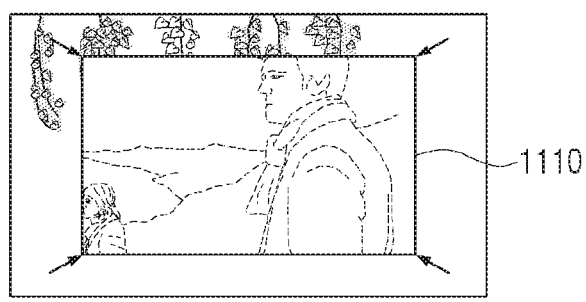

At the same time that the resolution of the first content screen is decreased, the processor 140 may control the display 120 to display the background image layer in a certain region 1110 of the second content screen. To be specific, as illustrated in FIG. 14C, the processor 140 may control the display 120 to display the background image layer in a center region of the second content screen. In this case, the object layer and the shadow layer may be generated after the first content image is removed, but example embodiments are not limited thereto. The processor 140 may display at least one from among the background image layer, the object layer, and the shadow layer in the certain region 1110 of the second content screen.

Figure 14D:
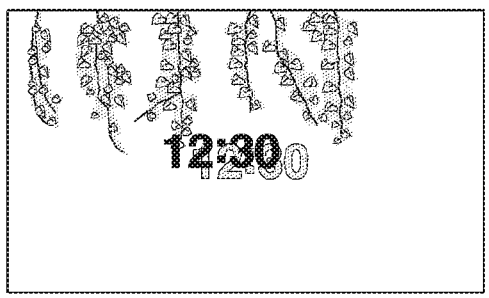

In response to the certain region 1110 of the second content screen being enlarged to be of equal size to the display 120, the electronic apparatus 100 may remove the second content screen and display the first content screen as illustrated in FIG. 14D, but example embodiments are not limited thereto. That is, in response to the certain region 1110 of the second content screen being enlarged to be of a predetermined size, the electronic apparatus 100 may remove the first content screen.

While the certain region 1110 of the second content screen is enlarged, the resolution of at least one from among the content layer and the content object included in the second content screen may be decreased gradually. That is, the electronic apparatus 100 may change the resolution of the second content screen and the first content screen according to the proportions of the second content screen and the first content screen in the display 120.

In this case, as described above with respect to FIGS. 13A to 13C, the certain region 1110 of the second content screen may be generated and enlarged in various positions according to various patterns.

[Example Embodiment: A Remote Control System Including an Electronic Apparatus]

According to the above-described example embodiments, the electronic apparatus 100 may form a remote control system 1000 in a combination of the remote control apparatus 200 and an external electronic apparatus 300.

Hereinafter, the remote control system 1000 including the electronic apparatus 100 will be described with reference to FIGS. 15 to 22.

Figure 15A:
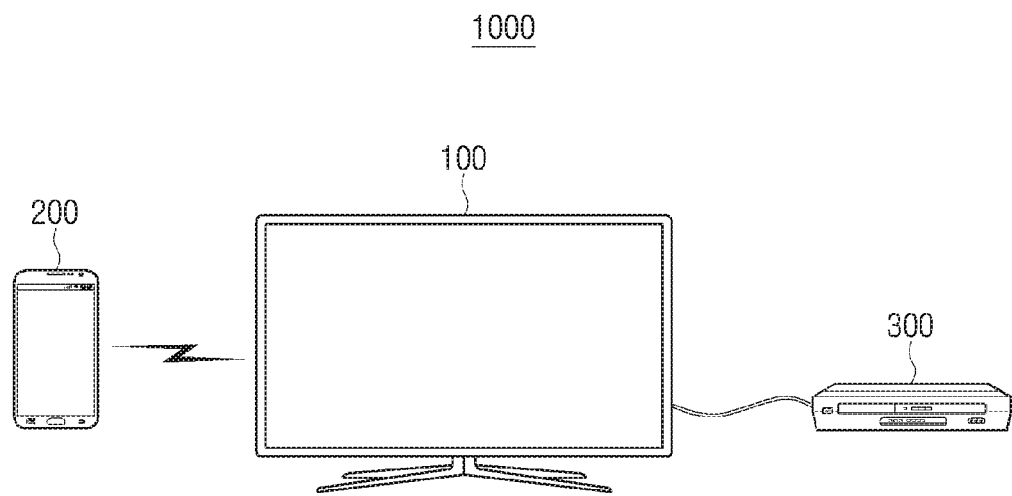
FIGS. 15A and 15B are diagrams illustrating a remote control system according to one or more example embodiments.
Figure 15B:
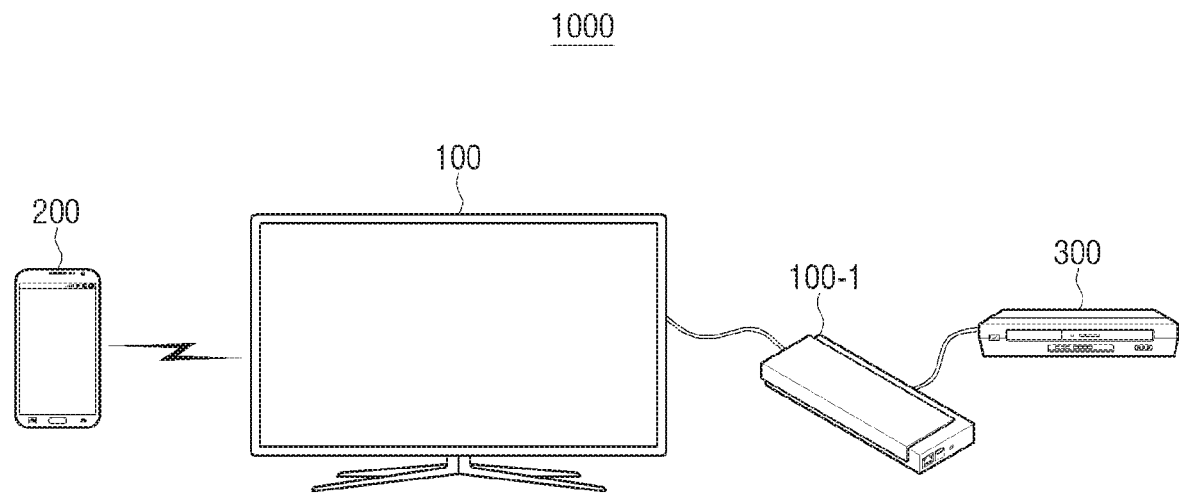

FIGS. 15A and 15B are diagrams illustrating a remote control system according to one or more example embodiments.

Referring to FIG. 15A, the remote control system 1000 according to an example embodiment includes the electronic apparatus 100, the remote control apparatus 200, and the external electronic apparatus 300.

As described above, the electronic apparatus 100 may be realized as a display apparatus with two operating modes, but example embodiments are not limited thereto. That is, the electronic apparatus 100 may be realized as a television (TV) and various other apparatuses for displaying an image, such as a smart TV, a smart phone, a tablet Personal Computer (PC), a projector, and so on.

The electronic apparatus 100 may be connected to the external electronic apparatus 300. For example, the electronic apparatus 100 may be connected to the external electronic apparatus 300 through various cables, such as a High Definition Multimedia Interface (HDMI) cable or an optical cable, but example embodiments are not limited thereto. That is, the electronic apparatus 100 may be connected to the external electronic apparatus 300 through wireless communication. For example, the electronic apparatus 100 may be connected to the external electronic apparatus 300 through various wireless communication methods, such as Bluetooth or Wi-Fi.

Accordingly, the electronic apparatus 100 may exchange diverse data with the external electronic apparatus 300. By way of example, the electronic apparatus 100 may receive the video data from the external electronic apparatus 300 and output an image based on the received video data. Further, the electronic apparatus 100 may receive a remote control signal for controlling the external electronic apparatus 300 from the remote control apparatus 200 and transmit the received remote control signal to the external electronic apparatus 300. A detailed description on this operation will be provided below.

The external electronic apparatus 300 with the above functions may be realized as a set-top box, but example embodiments are not limited thereto. The external electronic apparatus 300 may be realized as various apparatuses, such as a DVD player, a Blu-Ray player, a PC, a game player, a home theater system, an audio player, and so on.

In FIG. 15A, the electronic apparatus 100 is connected to one external electronic apparatus 300, but example embodiments are not limited thereto. The electronic apparatus 100 may be connected to a plurality of external electronic apparatuses 300.

The remote control apparatus 200 may control the electronic apparatus 100. As described above in FIGS. 6A and 6B, the remote control apparatus 200 may receive a user interaction and transmit the received user interaction to the electronic apparatus 100, but example embodiments are not limited thereto. That is, the remote control apparatus 200 may control the operating mode, a turn on/off operation, a channel, or a volume of electronic apparatus 100.

For this operation, the remote control apparatus 200 may transmit the remote control signal for controlling the electronic apparatus 100 to the electronic apparatus 100. By way of example, the remote control apparatus 200 may transmit the remote control signal to the electronic apparatus 100 through an infrared-ray (IR) method. In response to an IR signal being transmitted to the electronic apparatus 100, the electronic apparatus 100 may search for and execute a code set matching with the received IR signal from among pre-stored IR code sets. Accordingly, the remote control apparatus 200 may control the electronic apparatus 100.

However, the operation of the remote control apparatus 200 is not limited the above example. The remote control apparatus 200 may communicate with the electronic apparatus 100 through a wireless communication method, such as Bluetooth or Wi-Fi, and transmit the remote control signal to the electronic apparatus 100. In response to the remote control signal being transmitted to the electronic apparatus 100, the electronic apparatus 100 may search for and execute a code set matching with the received remote control signal from among pre-stored control code sets. Accordingly, the remote control apparatus 200 may control the electronic apparatus 100.

The remote control apparatus 200 may also control the external electronic apparatus 300. To be specific, the remote control apparatus 200 may control a turn on/off operation, a channel, or a volume of the external electronic apparatus 300.

For this operation, the remote control apparatus 200 may transmit a remote control signal for controlling the external electronic apparatus 300 to the electronic apparatus 100.

The remote control apparatus 200 may transmit the remote control signal to the electronic apparatus 100 through the IR method. The electronic apparatus 100 may transmit the IR signal received from the remote control apparatus 200 to the external electronic apparatus 300.

The electronic apparatus 100 may search for an IR code matching with the received IR signal from among a plurality of IR code sets stored for each external electronic apparatus 300. Subsequently, the electronic apparatus 100 may transmit the IR signal to the external electronic apparatus 300 controlled by the searched IR code. Accordingly, the remote control apparatus 200 may control the external electronic apparatus 300.

Further, the remote control apparatus 200 may communicate with the electronic apparatus 100 through Bluetooth and transmit the remote control signal to the electronic apparatus 100. In this case, the electronic apparatus 100 may search for an IR code corresponding to the remote control signal received from the remote control apparatus 200 from among the IR code sets pre-stored in the electronic apparatus 100 and transmit the searched IR code to the external electronic apparatus 300. Accordingly, the remote control apparatus 200 may control the external electronic apparatus 300.

However, the operation of the remote control apparatus 200 is not limited the above example. That is, the electronic apparatus 100 may transmit the remote control signal received from the remote control apparatus 200 through Bluetooth to the external electronic apparatus 300 through the wireless communication methods, such as Bluetooth or Wi-Fi. In this case, the electronic apparatus 100 may search for and execute a control code corresponding to the remote control signal from among the pre-stored control code sets. Accordingly, the remote control apparatus 200 may control the external electronic apparatus 300.

The remote control apparatus 200 may display a list of the external electronic apparatus 300 connected to the electronic apparatus 100. The remote control apparatus 200 may receive external apparatus-connection information of the electronic apparatus 100, that is, information on the external electronic apparatus 300 connected to the electronic apparatus 100, and display the list displaying external apparatus-connection information on at least one external electronic apparatus.

In this case, the remote control apparatus 200 may receive the external apparatus-connection information from at least one from among the electronic apparatus 100 and the external electronic apparatus 300.

To be specific, the remote control apparatus 200 may communicate with the electronic apparatus 100 through Bluetooth to receive the external apparatus-connection information from the electronic apparatus 100. Further, the remote control apparatus 200 may communicate with the external electronic apparatus 300 through Wi-Fi to receive the external apparatus-connection information from the external electronic apparatus 300.

However, the above-described communication methods are only an example, and the remote control apparatus 200 may receive the external apparatus-connection information from at least one from among the electronic apparatus 100 and the external electronic apparatus 300 through diverse communication methods.

The external apparatus-connection information may further include information on an interface of the electronic apparatus 100 connected with the external electronic apparatus 300 on top of the information on the external electronic apparatus 300 itself connected with the electronic apparatus 100, such as a type or a name.

For example, the external apparatus-connection information may include information that HDMI port 1 of the electronic apparatus 100 is connected to a set-top box, and HDMI port 2 is connected to a DVD player.

Figure 16:
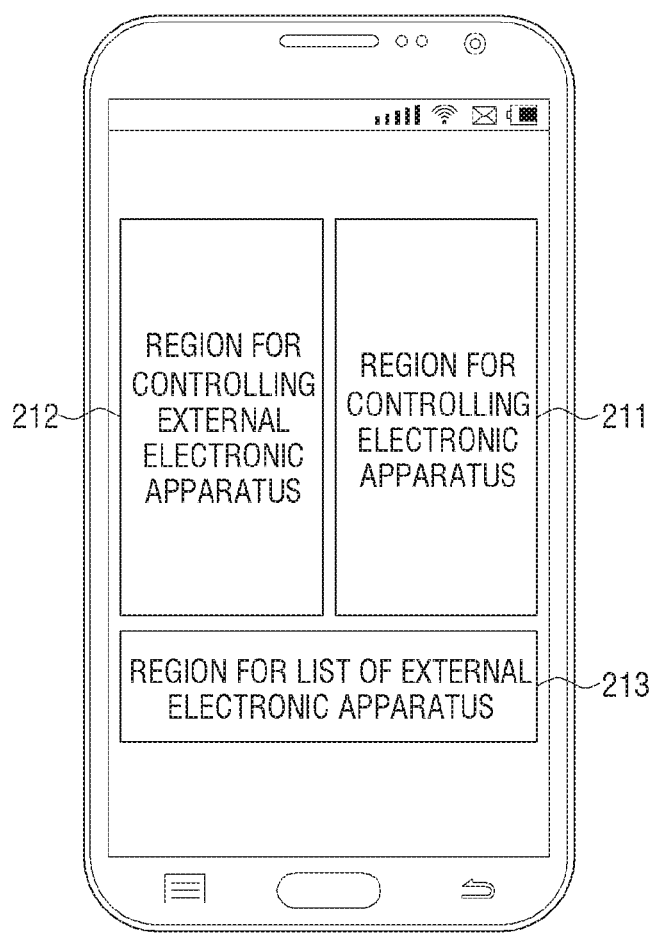
FIG. 16 is a diagram illustrating a screen of a remote control apparatus according to an example embodiment.

As illustrated in FIG. 16, the remote control apparatus 200 may display a first UI screen for controlling the electronic apparatus 100 in a first region 211, display a second UI screen for controlling the external electronic apparatus 300 in a second region 212, and display a third UI screen including the external apparatus-connection information, that is, the list of the external electronic apparatus 300 in a third region 213 of the display.

However, as described above, the operation of displaying the first to third UI screens together is only an example for illustrative purpose. By way of example, in response to the external electronic apparatus 300 not being connected to the electronic apparatus 100, the remote control apparatus 200 may display the first UI screen as a full screen without displaying the second and third UI screens. In this case, the remote control apparatus 200 may display the first UI screen for controlling the electronic apparatus 100 in the first region 211 and display the second region 212 and the third region 213 as empty regions. Further, the remote control apparatus 200 may display the first UI screen for controlling the electronic apparatus 100 in the first region 211, display the second region 212 as the empty region, and display a list of the external electronic apparatus 300 previously connected to the electronic apparatus 100 in the third region 213. Accordingly, the user may determine which external electronic apparatus 300 is connected to the electronic apparatus 100.

In the above example embodiment, the remote control system 1000 includes the electronic apparatus 100, the remote control apparatus 200, and the external electronic apparatus 300. However, the remote control system 1000 according to an example embodiment may further include an external apparatus 100-1 connected to the electronic apparatus 100, as illustrated in FIG. 15B.

In this case, the electronic apparatus 100 may provide the display function as a main function thereof and function as a relay device for data transmission between the remote control apparatus 200 and the external apparatus 100-1.

As illustrated in FIG. 15B, the external apparatus 100-1 may be connected to the electronic apparatus 100 and the external electronic apparatus 300. By way of example, the external apparatus 100-1 may be connected to the electronic apparatus 100 and the external electronic apparatus 300 through various cables, such as an HDMI cable or an optical cable.

However, the operation of the external apparatus 100-1 is not limited to the above example. The external apparatus 100-1 may be connected to the electronic apparatus 100 and the external electronic apparatus 300 through wireless communication. By way of example, the external apparatus 100-1 may be connected to the electronic apparatus 100 and the external electronic apparatus 300 through various wireless communication methods, such as Bluetooth, or Wi-Fi.

Accordingly, the external apparatus 100-1 may exchange diverse data with the electronic apparatus 100 and the external electronic apparatus 300. For example, the external apparatus 100-1 may receive the video data from the external electronic apparatus 300. Further, the external apparatus 100-1 may transmit the received video data to the electronic apparatus 100. Accordingly, the electronic apparatus 100 may output an image based on the received video data. Further, the external apparatus 100-1 may receive a remote control signal for controlling the external electronic apparatus 300 from the electronic apparatus 100 and transmit the received remote control signal to the external electronic apparatus 300. A detailed description on this operation will be provided below.

The external apparatus 100-1 may be realized as One Connect Box, but this is only an example for illustrative purpose. The external apparatus 100-1 may be connected to the electronic apparatus 100 and the external electronic apparatus 300 and may be realized as various electronic apparatuses for functioning as a relay device for data transmission between the electronic apparatus 100 and the external electronic apparatus 300.

In FIG. 15B, the external apparatus 100-1 is connected to one external electronic apparatus 300, but example embodiments are not limited thereto. The external apparatus 100-1 may be connected to the plurality of external electronic apparatuses 300.

As described above, the remote control apparatus 200 may control the electronic apparatus 100 and the external electronic apparatus 300. The method for controlling the electronic apparatus 100 was described above in FIG. 15A, and thus, a repeated description will be omitted.

The remote control apparatus 200 may transmit the remote control signal for controlling the external electronic apparatus 300 to the electronic apparatus 100 to control the external electronic apparatus 300.

For example, the remote control apparatus 200 may transmit the remote control signal to the electronic apparatus 100 through the IR method. In this case, the electronic apparatus 100 may transmit the IR signal received from the remote control apparatus 200 to the external apparatus 100-1.

The external apparatus 100-1 may search for an IR code matching with the received IR signal from among the plurality of IR code sets stored for each external electronic apparatus 300. Subsequently, the external apparatus 100-1 may transmit the IR signal to the external electronic apparatus 300 controlled by the searched IR code. Accordingly, the remote control apparatus 200 may control the external electronic apparatus 300.

Further, the remote control apparatus 200 may communicate with the electronic apparatus 100 through Bluetooth and transmit the remote control signal to the electronic apparatus 100. In this case, the electronic apparatus 100 may transmit the received remote control signal to the external apparatus 100-1.

Subsequently, the external apparatus 100-1 may search for an IR code corresponding to the remote control signal received from the electronic apparatus 100 from among the pre-stored IR code sets and transmit the searched IR code to the external electronic apparatus 300. Accordingly, the remote control apparatus 200 may control the external electronic apparatus 300.

However, this operation of the external apparatus 100-1 is not limited to the above example. The external apparatus 100-1 may transmit the remote control signal received from the remote control apparatus 200 through the wireless communication method, such as Bluetooth or Wi-Fi, to the external electronic apparatus 300. In this case, the external electronic apparatus 300 may search for and execute a control code corresponding to the remote control signal from the pre-stored control code sets. Accordingly, the remote control apparatus 200 may control the external electronic apparatus 300.

Further, the remote control apparatus 200 may display a list of the external electronic apparatus 300 connected to the external apparatus 100-1. To be specific, the remote control apparatus 200 may receive the external apparatus-connection information on the electronic apparatus 100, that is, information on the external electronic apparatus 300 connected to the external apparatus 100-1, and display a list displaying the external apparatus-connection information on at least one external electronic apparatus.

The remote control apparatus 200 may receive the external apparatus-connection information form at least one from among the electronic apparatus 100, the external apparatus 100-1, and the external electronic apparatus 300.

The remote control apparatus 200 may communicate with the electronic apparatus 100 through Bluetooth and receive the external apparatus-connection information from the electronic apparatus 100. Further, the remote control apparatus 200 may communicate with at least one from among the external apparatus 100-1 and the external electronic apparatus 300 through the wireless communication method, such as Wi-Fi, and receive the external apparatus-connection information on the electronic apparatus 100.

The above-described communication methods are only an example. The remote control apparatus 200 may receive the external apparatus-connection information from at least one from among the electronic apparatus 100, the external apparatus 100-1, and the external electronic apparatus 300 through diverse communication methods.

Further, the remote control apparatus 200 may display the first to third UI screens described above.

As described above, according to example embodiments, the remote control apparatus 200 may control the electronic apparatus 100 and the external electronic apparatus 300 connected to the electronic apparatus 100. Accordingly, the user convenience may be enhanced.

In addition, the remote control apparatus 200 according to an example embodiment may control the external electronic apparatus 300 through the electronic apparatus 100 when it is unavailable to transmit an IR signal to the external electronic apparatus 300 directly. Accordingly, the user convenience may be enhanced.

Hereinafter, an example in which the external electronic apparatus 300 is connected to the electronic apparatus 100 directly as illustrated in FIG. 15A will be described for convenience in explanation.

Figure 17:
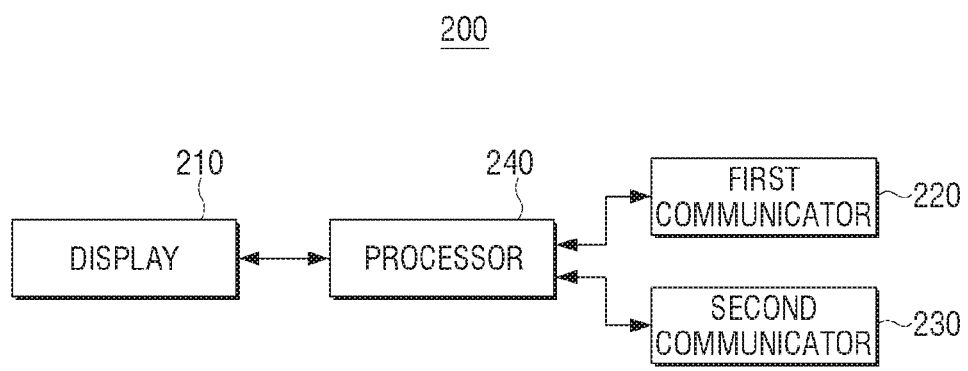
FIG. 17 is a block diagram illustrating a remote control apparatus according to an example embodiment.

FIG. 17 is a block diagram illustrating the remote control apparatus 200 according to an example embodiment.

Referring to FIG. 17, the remote control apparatus 200 includes a display 210, a first communicator 220, a second communicator 230, and a processor 240.

The display 210 displays various screens. Particularly, the display 210 may display the first UI screen for controlling the electronic apparatus 100 in the first region and display the second UI screen for controlling the external electronic apparatus 300 in the second region of the display 210. Further, the display 210 may display the third UI screen including the external apparatus-connection information of the electronic apparatus 100, that is, the information on the external electronic apparatus 300 connected to the electronic apparatus 100 in the third region of the display 210.

The display 210 may be realized as various kinds of displays, such as Liquid Crystal Display (LCD), Organic Light-Emitting Diode (OLED), Liquid Crystal on Silicon (LCoS), Digital Light Processing (DLP), or the like. Further, the display 210 may include a driver circuit that may be realized as a-si TFT, LTPS, TFT, or OTFT and a backlight unit.

The first communicator 220 may be realized as a unidirectional communication interface, and the second communicator 230 may be realized as a bidirectional communication interface. However, example embodiments are not limited thereto.

The first communicator 220 may transmit a remote control signal for controlling one of the electronic apparatus 100 and the external electronic apparatus 300 to the electronic apparatus 100 in one way. For example, in response to a graphic object for controlling the electronic apparatus 100 being selected through the first UI screen or a graphic object for controlling the external electronic apparatus 300 being selected through the second UI screen, the first communicator 220 may transmit an IR signal corresponding to the selected graphic object to the electronic apparatus 100 in one way.

For this operation, the first communicator 220 may include an IR signal generator and an IR signal transmitter.

The second communicator 230 may communicate with one of the electronic apparatus 100 and the external electronic apparatus 300 in both ways and exchange diverse data.

The second communicator 230 may communicate with one of the electronic apparatus 100 and the external electronic apparatus 300 through the wireless communication method, such as Bluetooth or Wi-Fi, and exchange diverse data in both ways.

As an example, the second communicator 230 may receive the external apparatus-connection information from one of the electronic apparatus 100 and the external electronic apparatus 300. Further, in response to receiving a command to select an external electronic apparatus connected to the electronic apparatus 100 other than the external electronic apparatus 300 being received through the third UI screen, the second communicator 230 may transmit the received command to the electronic apparatus 100. A detailed description on this operation will be provided below.

For this operation, the second communicator 230 may include a Wi-Fi chip, a Bluetooth chip, or a wireless communication chip.

The first communicator 220 and the second communicator 230 may be realized as bidirectional communication interfaces in different standards.

The first communicator 220 may perform the wireless communication with the electronic apparatus 100 through Bluetooth and transmit/receive diverse data in both ways. For example, in response to the electronic apparatus 100 being paired with the remote control apparatus 200, the first communicator 220 may transmit a remote control signal for controlling one of the electronic apparatus 100 and the external electronic apparatus 300 to the electronic apparatus 100.

For this operation, the first communicator 220 may include a Bluetooth chip.

The second communicator 230 may perform the wireless communication with the electronic apparatus 100 through Wi-Fi and transmit/receive diverse data in both ways. For example, the second communicator 230 may receive the external apparatus-connection information from the electronic apparatus 100 or from the external electronic apparatus 300. Further, in response to receiving a commend to select an external electronic apparatus connected to the electronic apparatus 100 other than the external electronic apparatus 300 through the third UI screen, the second communicator 230 may transmit the received command to the electronic apparatus 100.

The second communicator 230 may include a Wi-Fi chip, or a wireless communication chip.

The processor 240 controls overall operations of the remote control apparatus 200. For example, the processor 240 may control hardware components or software elements connected to the processor 240 by driving the O/S or an application program and process or compute various data. Further, the processor 240 may load and process a command or data received from at least one of the other components to a volatile memory and store diverse data in a non-volatile memory.

For this operation, the processor 240 may be realized a dedicated processor for performing functions (for example, embedded processor) or a generic-purpose processor for performing functions by running one or more software programs stored in a memory device (for example, a CPU or an application processor).

The processor 240 may control the display 210 to display the first UI screen for controlling the electronic apparatus 100. As an example, in response to the remote control apparatus 200 being turned on or an application pre-stored in the remote control apparatus being executed, the processor 240 may display the first UI screen for controlling the electronic apparatus 100.

In this case, the first UI screen may include a graphic object onto which key data for controlling the electronic apparatus 100 is mapped. The key data refers to data including a command to control the electronic apparatus 100 to be turned on or turned off.

For this operation, the remote control apparatus 200 may pre-store the graphic object onto which the key data for controlling the electronic apparatus 100 is mapped. To be specific, the processor 240 may display the first UI screen including the graphic object for controlling the electronic apparatus 100 based on the graphic object data in a storage, but example embodiments are not limited thereto. That is, the processor 240 may receive the graphic object onto which the key data for controlling the electronic apparatus 100 is mapped from an external server and display the graphic object.

The graphic object may vary depending on a characteristic of the electronic apparatus 100. As an example, in response to the electronic apparatus 100 being realized as a TV, the first UI screen may include a graphic object corresponding to basic keys that are used on a TV, such as an operating mode change key, a turn on/off key, a channel control key, and a volume control key, etc. The first UI screen may further include an input key for inputting a user interaction, for example, a doodle interaction.

The processor 240 may control the first communicator 220 to transmit the remote control signal for performing the functions of the electronic apparatus 100 to the electronic apparatus 100.

To be specific, in response to receiving a user command to select the graphic object included in the first UI screen, the processor 240 may control the first communicator 220 to transmit the key data mapped onto the selected graphic object to the electronic apparatus 100.

In this case, the processor 240 may transmit the remote control signal through the IR method to control the electronic apparatus 100. In response to the IR signal being transmitted from the processor 240 to the electronic apparatus 100, the electronic apparatus 100 may search for and execute a code set matching with the received IR signal from the pre-stored IR code sets. Accordingly, the remote control apparatus 200 may control the electronic apparatus 100.

Further, the processor 240 may transmit the remote control signal through Bluetooth to control the electronic apparatus 100. In response to the remote control signal being transmitted from the processor 240 to the electronic apparatus 100 through Bluetooth, the electronic apparatus 100 may search for and execute a control code matching with the received remote control signal from the pre-stored control code sets. Accordingly, the remote control apparatus 200 may control the electronic apparatus 100.

The processor 240 may control the display 210 to display the second UI screen for controlling the external electronic apparatus 300. For example, in response to the remote control apparatus 200 being turned on or an application pre-stored in the remote control apparatus being executed, the processor 240 may display the second UI screen for controlling the external electronic apparatus 300.

In response to a plurality of external electronic apparatuses being connected to the electronic apparatus 100, the processor 240 may display the second UI screen for controlling an external electronic apparatus corresponding to an input source of the current electronic apparatus 100. For example, in response to a set-top box and a DVD player being connected to an interface of the electronic apparatus 100, and the current electronic apparatus 100 displaying an image provided from the set-top box, the processor 240 may display the second UI screen for controlling the set-top box that is the input source of the current electronic apparatus 100.

The processor 240 may receive information on the current input source from the electronic apparatus 100.

The second UI screen may include a graphic object onto which key data for controlling the external electronic apparatus 300 is mapped. The key data may refer to data including a command to control the external electronic apparatus 300 to be turned on or turned off.

For this operation, the remote control apparatus 200 may pre-store the graphic object onto which the key data for controlling the external electronic apparatus 300 is mapped. The processor 240 may display the second UI screen including the graphic object for controlling the external electronic apparatus 300 based on the graphic object in the storage, but example embodiments are not limited thereto. That is, the processor 240 may receive the graphic object onto which the key data for controlling the external electronic apparatus 300 is mapped from the external server and display the graphic object.

The graphic object may vary depending on a characteristic of the external electronic apparatus 300. For example, if the external electronic apparatus 300 is realized as a set-top box, the second UI screen may include a graphic object corresponding to basic keys that are used on a set-top box, such as a turn on/off key, a channel control key, or a volume control key, and special keys, such as TV replay key, or a TV program schedule key.

The processor 240 may control the first communicator 220 to transmit a remote control signal for performing the functions of the external electronic apparatus 300, such as the TV replay or TV program schedule, to the electronic apparatus 100. To be specific, in response to receiving a user command to select the graphic object included in the second UI screen, the processor 240 may control the first communicator 220 to transmit the key data mapped onto the selected graphic object to the electronic apparatus 100.

The processor 240 may transmit the remote control signal through the IR method to control the external electronic apparatus 300. To be specific, in response to an IR signal being transmitted from the processor 240 to the electronic apparatus 100, the electronic apparatus 100 may search for an IR code matching with the received IR signal from the IR code sets pre-stored for each external electronic apparatus 300 and transmit the IR signal to the external electronic apparatus 300 controlled by the searched IR code. Accordingly, the remote control apparatus 200 may control the external electronic apparatus 300.

The processor 240 may transmit the remote control signal through Bluetooth to control the external electronic apparatus 300. To be specific, in response to the remote control signal being transmitted from the processor 240 to the electronic apparatus 100 through Bluetooth, the electronic apparatus 100 may search for an IR code corresponding to the received remote control signal from the IR code sets pre-stored in the electronic apparatus 100 and transmit the searched IR code to the external electronic apparatus 300. Accordingly, the remote control apparatus 200 may control the external electronic apparatus 300.

In response to the remote control signal being transmitted from the processor 240 to the electronic apparatus 100 through Bluetooth, the electronic apparatus 100 may transmit the remote control signal received from the remote control apparatus 200 to the external electronic apparatus 300 through the wireless communication method, such as Bluetooth or Wi-Fi. In this case, the external electronic apparatus 300 may search for and execute a control code corresponding to the remote control signal from the pre-stored control code sets. Accordingly, the remote control apparatus 200 may control the external electronic apparatus 300.

The processor 240 may display the first UI screen for controlling the electronic apparatus 100 in the first region, display the second UI screen for controlling the external electronic apparatus 300 in the second region, and display the third UI screen including the list of the external electronic apparatus 300 in the third region of the display 210.

The list of the external electronic apparatus 300 may include the external apparatus-connection information, that is, the information on the external electronic apparatus 300 connected to the electronic apparatus 100. The external apparatus-connection information may include the information on the external electronic apparatus 300 itself connected to the electronic apparatus 100, such as a type or name of the external electronic apparatus 300, and further include information on an interface of the electronic apparatus 100 connected to the external electronic apparatus 300.

For this operation, the processor 240 may receive the external apparatus-connection information from at least one of the electronic apparatus 100 and the external electronic apparatus 300.

The processor 240 may communicate with the electronic apparatus 100 through Bluetooth and receive the external apparatus-connection information from the electronic apparatus 100. Further, the processor 240 may communicate with the external electronic apparatus 300 through the wireless communication method, such as Wi-Fi, and receive the external apparatus-connection information on the electronic apparatus 100 from the external electronic apparatus 300.

Further, in response to another external electronic apparatus, for example, a second external electronic apparatus, being selected through the third UI screen based on the external apparatus-connection information, the processor 240 may transmit a command to select the second external electronic apparatus to the electronic apparatus 100 through the second communicator 230.

Hereinafter, an external electronic apparatus controlled through the second UI screen is defined as a first external electronic apparatus, an external electronic apparatus selected through the third UI screen as a second external electronic apparatus for convenience in explanation.

To be specific, in response to receiving a user command to select any one of at least one external electronic apparatus displayed in the third UI screen, for example, the second external electronic apparatus, the processor 240 may transmit a select command including the connection information on the second external electronic apparatus to the electronic apparatus 100.

In response to receiving the select command to select the second external electronic apparatus from the processor 240 while operating by using the first external electronic apparatus as a source, the electronic apparatus 100 may operate by using the second external electronic apparatus as the source based on an input source change command included in the select command.

The processor 240 may change and display the second UI screen for controlling the first external electronic apparatus displayed in the second region to a fourth UI screen for controlling the second external electronic apparatus.

To be specific, in response to receiving he user command to select the second external electronic apparatus, the processor 240 may search for a graphic object for controlling the second external electronic apparatus corresponding to the select command from among the graphic objects pre-stored in the remote control apparatus 200.

Accordingly, the processor 240 may change and display the second UI screen for controlling the first external electronic apparatus display in the second region to the fourth UI screen for controlling the second external electronic apparatus.

In the above example embodiment, mobile object data related to the second external electronic apparatus are pre-stored, but this is only an example. The processor may receive the graphic object onto which the key data for controlling the second external electronic apparatus is mapped from the external server and display the graphic object.

Subsequently, in response to receiving a user command to select a graphic object included in the fourth UI screen, the processor 240 may transmit a remote control signal corresponding to the selected graphic object to the electronic apparatus 100. Accordingly, the remote control apparatus 200 may control the second external electronic apparatus.

As described above, the remote control apparatus 200 according to an example embodiment may provide the UI screen for controlling both of the electronic apparatus 100 and the first external electronic apparatus. Further, in response to the second external electronic apparatus being selected by a user command and a source of the electronic apparatus 100 being changed, the remote control apparatus 200 may provide the UI screen for controlling the second external electronic apparatus. Accordingly, the user convenience may be enhanced.

Figure 18:
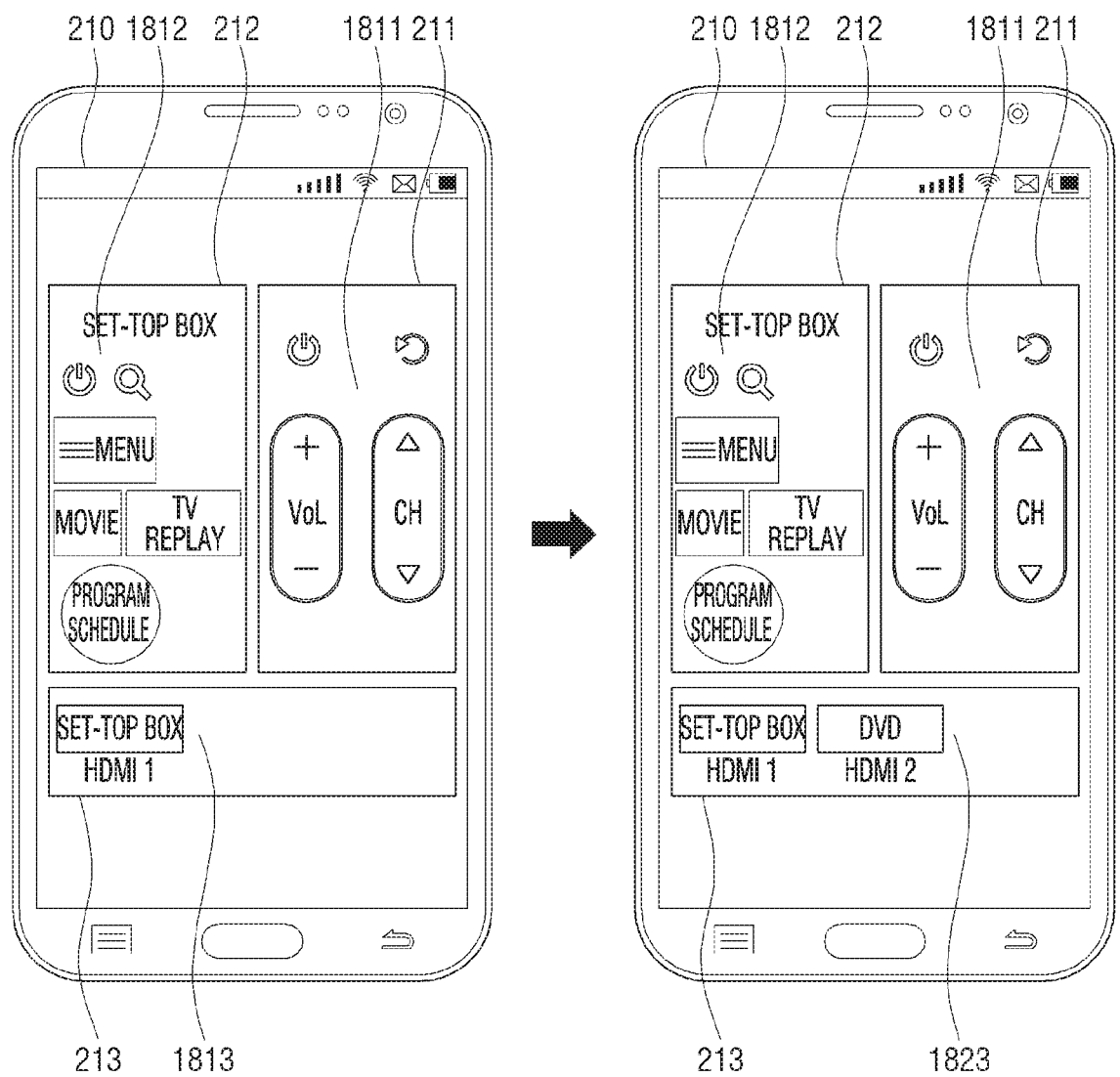
FIG. 18 is a diagram illustrating how the remote control apparatus changes and displays a User Interface (UI) screen, according to an example embodiment.

FIG. 18 is a diagram provided to describe how the remote control apparatus changes and displays a third User Interface (UI) screen, according to an example embodiment.

Referring to the left side of FIG. 18, in response to the electronic apparatus 100 being realized as a TV, and the first external electronic apparatus being realized as a set-top box, the processor 240 may display a first UI screen 1811 for controlling the TV, that is, the electronic apparatus 100, in the first region 211, display a second UI screen 1812 for controlling the set-top box in the second region 212, and display a third UI screen 1813 including a list of the external electronic apparatus 300 connected to the TV in the third region 213.

in response to the remote control apparatus 200 being connected to the second external electronic apparatus, for example, a DVD player, the processor 240 may receive the connection information on the DVD player from the electronic apparatus 100, as described above.

Further, as described above, the processor 240 may receive the connection information on the DVD player from the second external electronic apparatus, that is, the DVD player. the processor 240 may communicate with the second external electronic apparatus to transmit a signal requesting the connection information on the electronic apparatus 100 of the second external electronic apparatus to the second external electronic apparatus. The second external electronic apparatus may transmit the connection information to the remote control apparatus 200.

Further, as described above, the processor 240 may determine the information on a type and a name of the second external electronic apparatus and an interface of an electronic apparatus to which the second external electronic apparatus is connected based on the received connection information on the second external electronic apparatus.

The processor 240 may change the third UI screen 1813 displayed in the third region 213 to a UI screen including the connection information on the DVD player.

Referring to the right side of FIG. 18, by way of example, in response to determining that the second external electronic apparatus is a DVD player and connected through HDMI port 2 of the electronic apparatus 100 based on the connection information on the second external electronic apparatus, the processor 240 may display a list 1823 including 'DVD (HDMI 2)' in the third region 213.

As described above, the UI 1823 including the connection information on the second external electronic apparatus may be displayed by connecting the second external electronic apparatus to the remote control apparatus 200. Accordingly, the user may recognize the type of the external electronic apparatus connected to the electronic apparatus 100 quickly.

Figure 19:
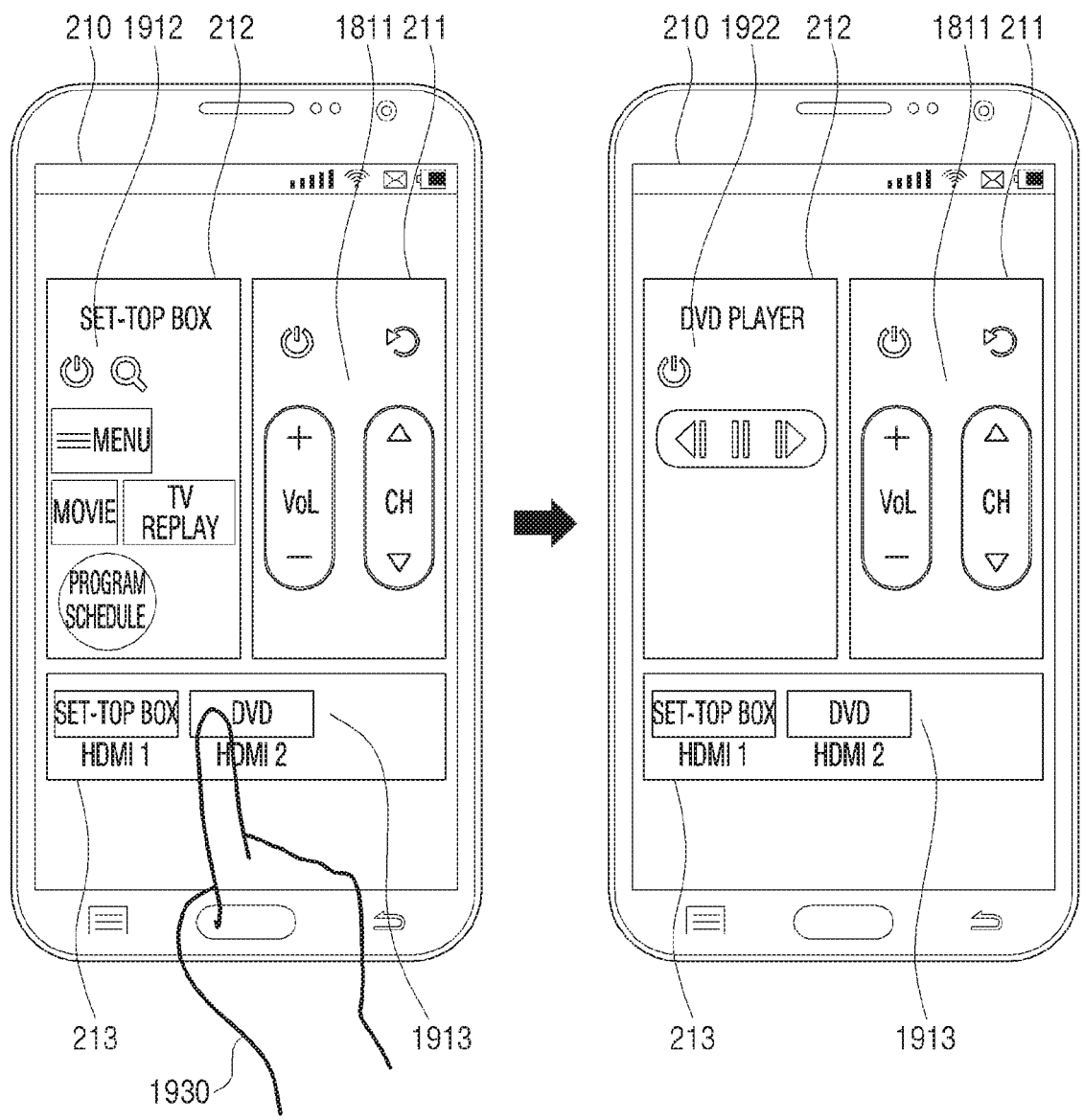
FIG. 19 is a diagram illustrating an operation of a remote control apparatus when an external electronic apparatus is selected through a UI screen, according to an example embodiment.

FIG. 19 is a diagram illustrating an operation of the remote control apparatus when an external electronic apparatus is selected through the third UI screen, according to an example embodiment.

In response to receiving a user command to select the second external electronic apparatus through the fourth UI screen while the second UI screen for controlling the first external electronic apparatus is displayed in the second region, the processor 240 may transmit a source change command to the electronic apparatus 100. To be specific, the processor 240 may transmit a source change command including a command to change the input source of the electronic apparatus 100 from the first external electronic apparatus to the second external electronic apparatus to the electronic apparatus 100.

Further, in response to receiving the user command to select the second external electronic apparatus through the fourth UI screen, the processor 240 may change the second UI screen to the fourth UI screen for controlling the second external electronic apparatus.

For example, referring to the left side of FIG. 19, in response to receiving the user command to select the second external electronic apparatus (1930), for example, the DVD player, through the third UI screen 213 (1913), the processor 240 may search for a graphic object corresponding to the second external electronic apparatus selected by the user command from the graphic object data in the storage, change the second UI screen 1912 to the fourth UI screen 1922, and change the second UI screen 1912 to the fourth UI screen 1922.

Accordingly, the user may select and control a desired external electronic apparatus conveniently from among the plurality of the external electronic apparatuses connected to the electronic apparatus 100.

Figure 20:
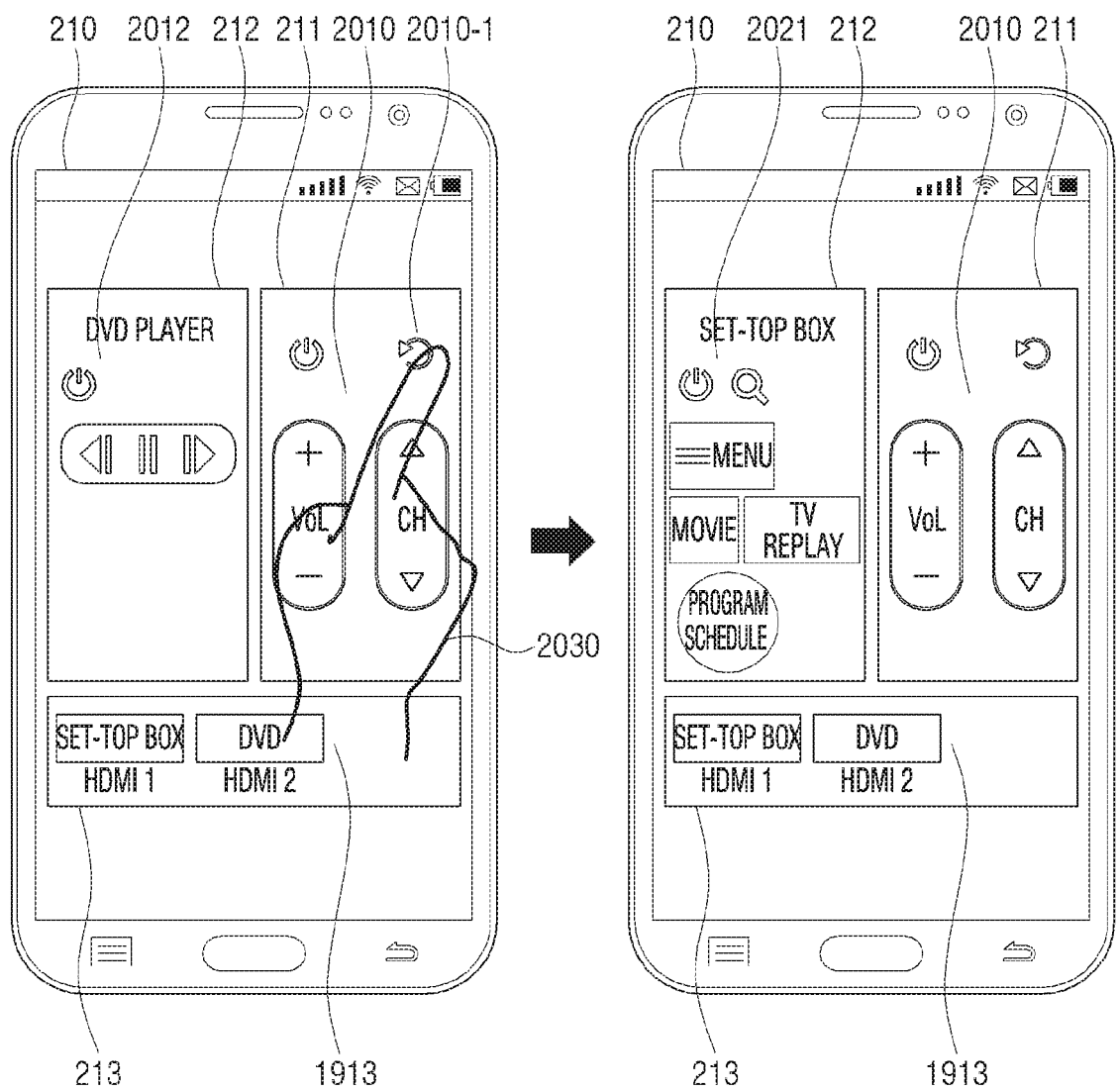
FIG. 20 is a diagram illustrating an operation of a remote control apparatus when an input source of an electronic apparatus is changed, according to an example embodiment.

FIG. 20 is a diagram provided to describe an operation of the remote control apparatus when the input source of the electronic apparatus is changed, according to an example embodiment.

In response to receiving a command to change an input source of the electronic apparatus 100, the processor 240 may change and the fourth UI screen to the second UI screen again.

For example, referring to the left side of FIG. 20, a first UI screen 2010 may display a graphic object 2010-1 onto which key data for changing a source of the electronic apparatus 100. In this case, in response to a source change key of the electronic apparatus 100 being selected by a user input (2030), the processor 240 may transmit the source change command to the electronic apparatus 100.

For example, in response to receiving the source change command from the remote control apparatus 200 while the electronic apparatus 100 displays an image provided by the current second external electronic apparatus, for example, a DVD player, the electronic apparatus 100 may change the source to the first external electronic apparatus which is the next source connected to the electronic apparatus 100, for example, a set-top box, and display an image provided by the set-top box.

In this case, the processor 240 may receive the connection information on the changed external electronic apparatus from the electronic apparatus 100. Accordingly, the processor 240 may search for a graphic object corresponding to the changed external electronic apparatus based on the received connection information and display a UI screen for controlling the changed external electronic apparatus in the second region 212.

By way of example, as illustrated on the left side of FIG. 20, in response to the source being changed to the set-top box according to the source change command 2030 while the electronic apparatus 100 provides the image by using the DVD player as the source, the processor 240 may receive identification information on the set-top box from the electronic apparatus 100.

Accordingly, as illustrated at the right side of FIG. 20, the processor 240 may change the fourth UI screen 2012 to the second UI screen 2021.

Accordingly, the user may change the UI screen of the second region by changing the source of the electronic apparatus without selecting an external electronic apparatus to be controlled through the list of the external electronic apparatus and control the external electronic apparatus conveniently.

Figure 21:
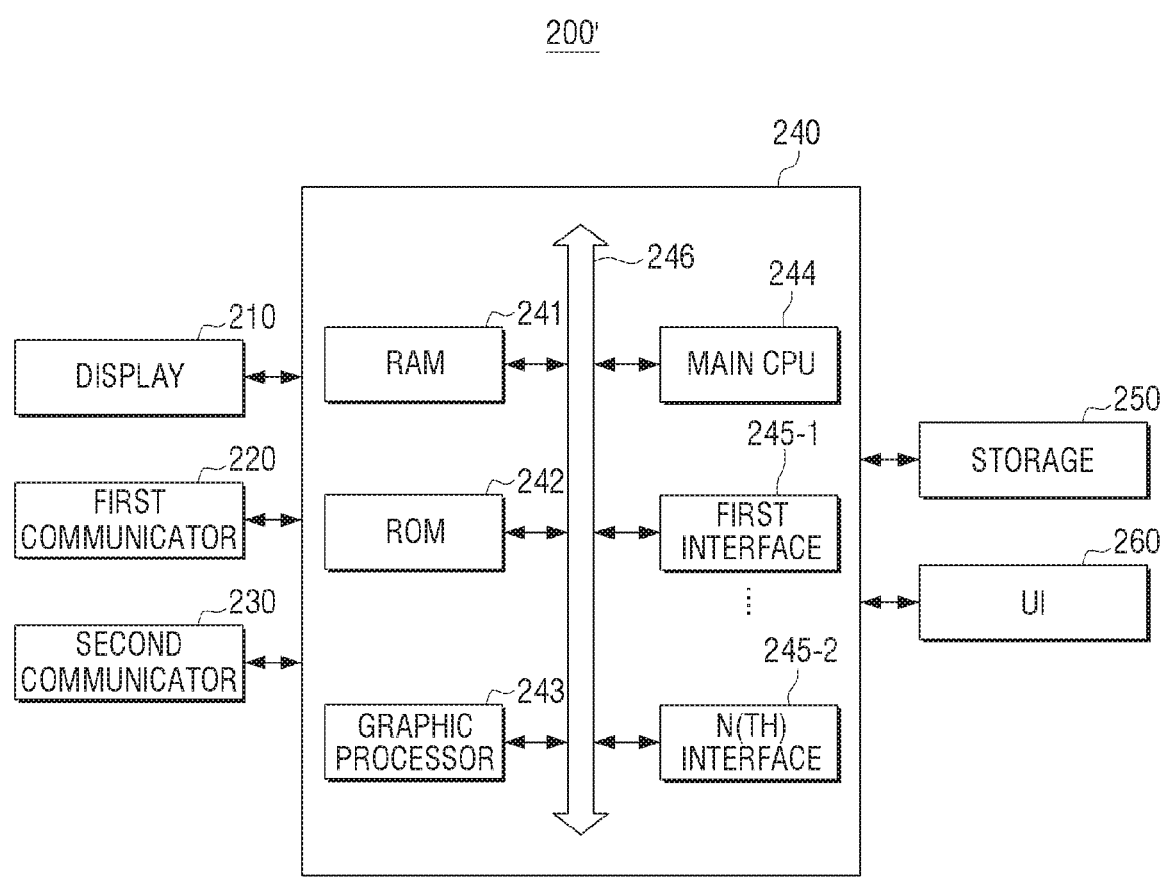
FIG. 21 is a block diagram illustrating a detailed structure of a remote control apparatus according to an example embodiment.

FIG. 21 is a block diagram illustrating a detailed structure of a remote control apparatus according to an example embodiment.

Referring to FIG. 21, a remote control apparatus 200' according to an example embodiment includes a display 210, a first communicator 220, a second communicator 230, a processor 240, a storage 250 (e.g., memory), and a User Interface (UI) 260. In the following description, a repeated description will be omitted.

The storage 250 may store an Operating System (O/S) for controlling overall operations of the components of the remote control apparatus 200' and commands or data relevant to the components of the remote control apparatus 200'.

Accordingly, the processor 240 may control a plurality of hardware components or software elements of the remote control apparatus 200' by using diverse commands or data in the storage 250, load and process a command or data received from at least one of the other components in a volatile the memory, and store diverse data in a non-volatile the memory.

The UI 260 receives various user commands. The UI 260 may receive a user command for various UI screens for controlling the functions of the remote control apparatus 200' displayed in the display 210. In response to the UI 260 being displayed through the display 210, the UI 260 may receive a user command to select a graphic object through a touch.

The processor 240 controls overall operations of the remote control apparatus 200'.

The processor 240 includes a Random Access Memory (RAM) 241, a Read-Only Memory (ROM) 242, a graphic processor 243, a main Central Processing Unit (CPU) 244, first to n(th) interfaces 245-1 to 245-n, and a bus 246. The RAM 241, the ROM 242, the graphic processor 243, the main CPU 244, and the first to n(th) interfaces 245-1 to 245-n may be interconnected through the bus 246.

The first to n(th) interfaces 245-1 to 245-n may be connected to the aforementioned various components. One of the interfaces 245-1 to 245-n may be realized as a network interface connected to an external apparatus through a network.

The main CPU 244 may access the storage 250 and perform a boot-up operation by using the O/S in the storage 250. Further, the main CPU 244 may perform various operations by using diverse programs, contents, and data stored in the storage 250.

The RAM 241 may store a command set for system booting. In response to the power being supplied to the remote control apparatus 200', the main CPU 244 may copy the O/S in the storage 250 to the RAM 241 according to the commands stored in the ROM 242, and boot up the system by executing the O/S. Upon completion of the boot-up operation, the main CPU 244 may copy various programs in the storage 250 to the RAM 241 and execute the programs copied to the RAM 241 to perform various operations.

The graphic processor 243 may generate a screen including various objects, such as icons, images, or text, by using a computing unit and a rendering unit. The computing unit may compute attribute values, such as coordinate values, shapes, sizes, and colors of the objects, according to a layout of the screen based on the received control command. The rendering unit may generate a screen including the objects in various layouts based on the attribute values computed by the computing unit. The screen generated by the rendering unit may be displayed in the display 210.

Figure 22:
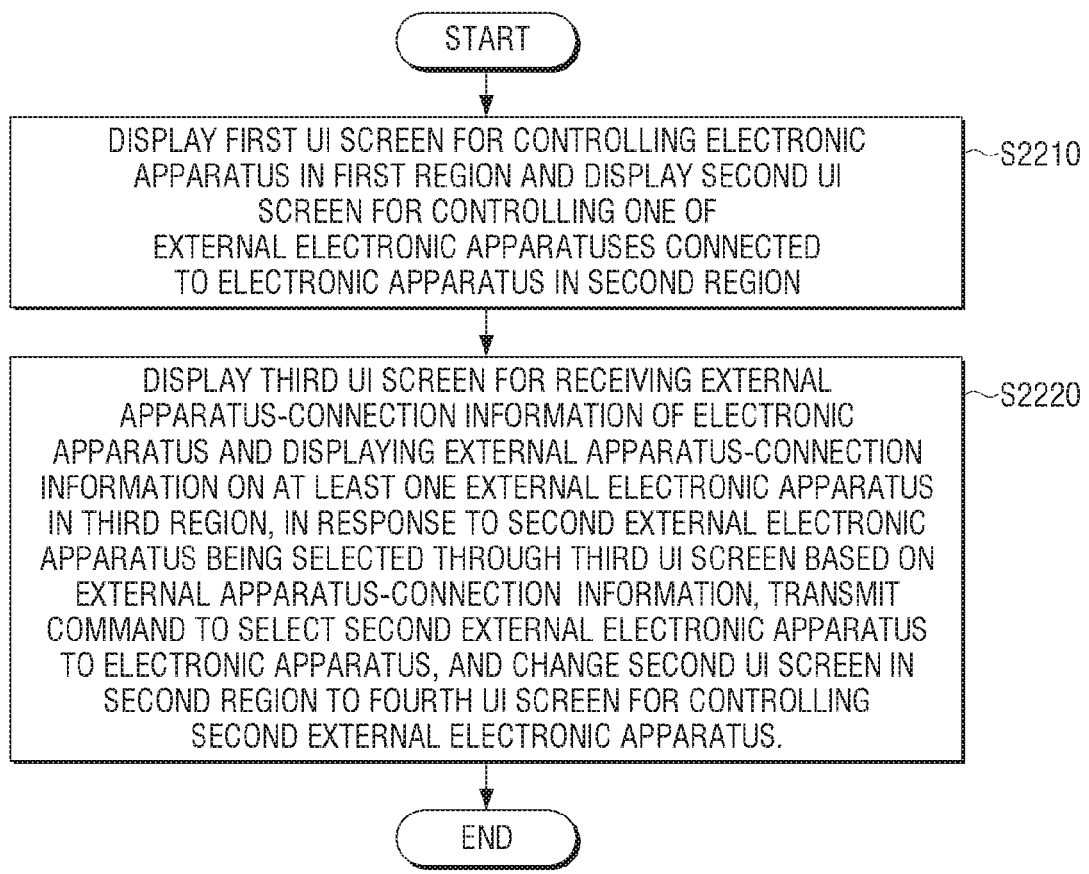
FIG. 22 is a flowchart illustrating a method for controlling a remote control apparatus according to an example embodiment.

FIG. 22 is a flowchart provided to describe a method for controlling a remote control apparatus according to an example embodiment.

The remote control apparatus may display a first UI screen for controlling an electronic apparatus in a first region and display a second UI screen for controlling an external electronic apparatus in a second region to control one of the electronic apparatus and the first external electronic apparatus connected to the electronic apparatus (S2210). Further, the remote control apparatus may display a third UI screen for receiving external apparatus-connection information of the electronic apparatus and displaying the external apparatus-connection information on at least one external electronic apparatus in a third region. In response to a second external electronic apparatus being selected based on the external apparatus-connection information received through the third UI screen, the remote control apparatus may transmit a select command to select the second external electronic apparatus to the electronic apparatus and change the second UI screen in the second region to a fourth UI screen for controlling the second external electronic apparatus (S2220). Accordingly, the remote control apparatus may provide the user with the UI screens for controlling the electronic apparatus and the external electronic apparatus. Further, in response to the input source of the electronic apparatus being changed, the remote control apparatus may provide the UI screen for controlling the external electronic apparatus corresponding to the changed input source. Accordingly, the user may control both of the electronic apparatus and the external electronic apparatus conveniently.

Figure 23:
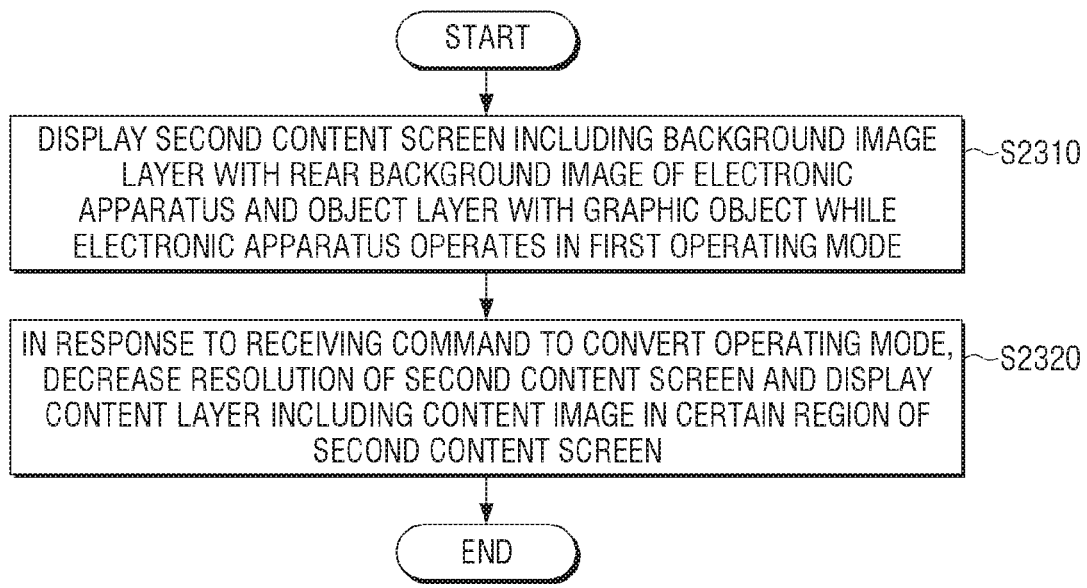
FIG. 23 is a flowchart illustrating a method for controlling an electronic apparatus 100 according to an example embodiment.

FIG. 23 is a flowchart provided to describe a method for controlling an electronic apparatus 100 according to an example embodiment.

In the first operating mode, the electronic apparatus 100 may display a first content screen including a background image layer with a rear background image of the electronic apparatus 100 and an object layer with a graphic object (S2310). As described above, the operation may be performed in the same manner when the operating mode of the electronic apparatus 100 is converted from the second operating mode to the first operating mode.

In response to receiving a command to convert an operating mode, the electronic apparatus 100 may decrease the resolution of the first content screen and display a content layer including a content image in a certain region of the first content screen (S2320). The electronic apparatus 100 may remove a shadow layer included in the first content screen and decrease the resolution of the object layer and the background image layer.

The methods according to the above-described example embodiments may be realized as software or applications that may be installed in the existing electronic apparatus.

Further, the methods according to the above-described example embodiments may be realized by upgrading the software or hardware of the existing electronic apparatus.

The above-described example embodiments may be executed through an embedded server in the electronic apparatus or through an external server outside the electronic apparatus.

The control method according to the above-described example embodiments may be realized as a program and installed in the electronic apparatus. Particularly, the program including the control method may be stored in a non-transitory computer readable medium.

A non-transitory computer readable medium refers to a machine-readable medium that stores data permanently or semi-permanently unlike a register, a cache, or a memory that stores data for a short time. Particularly, the above-described various applications and programs may be stored in and provided through the non-transitory computer readable medium, such as a Compact Disc (CD), a Digital Versatile Disc (DVD), a hard disc, a Blu-ray disc, a Universal Serial Bus (USB), a memory card, a Read-Only Memory (ROM), or the like.

Above, example embodiments have been shown and described. The foregoing example embodiments and advantages are merely examples and are not to be construed as limiting the present disclosure. The present teaching can be readily applied to other types of devices. Also, the description of the example embodiments is intended to be illustrative, and not to limit the scope of the claims, and many alternatives, modifications, and variations will be apparent to a person having ordinary skill in the art.

What is claimed is:

1. An electronic apparatus comprising:
a display; and
a processor configured to:
based on the electronic apparatus being operated in a first operating mode, control the display to display a first layer comprising a rear background image of the electronic apparatus and a graphic object, and
based on receiving a convert command to convert to a second operating mode, control the display to add a content layer that includes a content image enlarged gradually from a region of the displayed first layer to an entirety of a screen of the display, wherein the rear background image remains displayed while the content image is gradually enlarging,
wherein the processor is further configured to remove the rear background image from the display based on the content layer being enlarged to be of equal size to the entirety of the screen of the display,
wherein the first layer further comprises a shadow image, and
wherein the processor is further configured to, based on receiving the convert command to convert to the second operating mode, remove the shadow image.

2. The electronic apparatus as claimed in claim 1, wherein the content layer has a resolution higher than a resolution of the first layer.

3. The electronic apparatus as claimed in claim 1, wherein the processor is further configured to, based on receiving the convert command to convert to the second operating mode, control the display to decrease the resolution of the first layer.

4. The electronic apparatus as claimed in claim 1, wherein the processor is further configured to:
based on the electronic apparatus being operated in the second operating mode, control the display to display the content layer in the display, and
based on receiving a convert command to convert to the first operating mode, control the display to decrease the resolution of the content layer displayed in the display and add the first layer enlarged gradually from the region of the displayed content layer.

5. The electronic apparatus as claimed in claim 4, wherein the content layer further comprises another graphic object that is different from the displayed graphic object; and
the processor is further configured to, based on receiving the convert command to convert from the second operating mode to the first operating mode, control the display to remove the other graphic object in the content layer.

6. The electronic apparatus as claimed in claim 1, further comprising:
a communicator; and
a memory configured to store the rear background image of the electronic apparatus,
wherein the processor is further configured to, based on receiving a signal corresponding to a user interaction inputted from a user terminal through the communicator, control the display to change the graphic object corresponding to the user interaction and display the changed graphic object in the first layer.

7. The electronic apparatus as claimed in claim 6, wherein the controlling of the display to change the graphic object includes controlling the display to change at least one from among a size, a number, a position, a color, or a brightness of the displayed graphic object.

8. The electronic apparatus as claimed in claim 7, wherein the memory is configured to store data about the change of the graphic object corresponding to the user interaction.

9. A method for displaying contents of an electronic apparatus, the method comprising:
displaying, based on the electronic apparatus being operated in a first operating mode, a first layer comprising a rear background image of the electronic apparatus and a graphic object;
based on receiving a convert command to convert to a second operating mode, adding a content layer that includes a content image enlarged gradually from a region of the displayed first layer to an entirety of a screen of a display,
wherein the rear background image remains displayed while the content image is gradually enlarging; and
removing the rear background image from the display based on the content layer being enlarged to be of equal size to the entirety of the screen of the display,
wherein the first layer further comprises a shadow image,
wherein the method further comprises, based on the first operating mode being converted to the second operating mode, removing the shadow image.

10. The method as claimed in claim 9, wherein the content layer has a resolution higher than a resolution of the first layer.

11. The method as claimed in claim 9, further comprising:
decreasing, based on receiving the convert command to convert to the second operating mode, the resolution of the first layer.

12. The method as claimed in claim 9, further comprising:
displaying, based on the electronic apparatus being operated in the second operating mode, the content layer, and
decreasing, based on receiving a convert command to convert to the first operating mode, the resolution of the content layer and adding the first layer gradually enlarged from the region of the displayed content layer.

13. The method as claimed in claim 12, wherein the content layer further comprises another graphic object that is different from the displayed graphic object, wherein the method further comprises, based on the second operating mode being converted to the first operating mode, removing the other graphic object in the content layer.

14. The method as claimed in claim 9, further comprising:
receiving a user interaction inputted from a user terminal;
changing the graphic object corresponding to the user interaction; and
displaying the changed graphic object in the first layer.

15. The method as claimed in claim 14, wherein the controlling of the display to change the graphic object includes controlling the display to change at least one from among a size, a number, a position, a color, or brightness of the displayed graphic object based on the user interaction.

* * * * *